(12) United States Patent
Park et al.

(10) Patent No.: US 12,016,003 B2
(45) Date of Patent: Jun. 18, 2024

(54) METHOD AND DEVICE FOR TRANSMITTING FEEDBACK FRAME IN WIDE BAND IN WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 17/597,318

(22) PCT Filed: Jun. 16, 2020

(86) PCT No.: PCT/KR2020/007785
§ 371 (c)(1),
(2) Date: Jan. 3, 2022

(87) PCT Pub. No.: WO2021/006495
PCT Pub. Date: Jan. 14, 2021

(65) Prior Publication Data
US 2022/0322348 A1 Oct. 6, 2022

(30) Foreign Application Priority Data

Jul. 8, 2019 (KR) .................. 10-2019-0082114

(51) Int. Cl.
*H04W 72/02* (2009.01)
*H04W 72/0453* (2023.01)
*H04W 84/12* (2009.01)

(52) U.S. Cl.
CPC ....... *H04W 72/0453* (2013.01); *H04W 72/02* (2013.01); *H04W 84/12* (2013.01)

(58) Field of Classification Search
CPC .. H04W 72/0453; H04W 72/02; H04W 84/12
(Continued)

(56) References Cited

U.S. PATENT DOCUMENTS 10,070,418 B2 * 9/2018 Liu .................. H04L 5/0023
2015/0296454 A1 * 10/2015 Lee .................. H04W 52/0209
370/311
(Continued)

FOREIGN PATENT DOCUMENTS

KR 20140109374 9/2014

OTHER PUBLICATIONS

PCT International Application No. PCT/KR2020/007785, International Search Report dated Sep. 21, 2020, 4 pages.
(Continued)

*Primary Examiner* — Anthony Mejia
(74) *Attorney, Agent, or Firm* — LEE, HONG, DEGERMAN, KANG & WAIMEY

(57) ABSTRACT

Proposed are a method and device for receiving a feedback frame for MIMO beamforming in a wide band in a wireless LAN system. Specifically, a reception STA receives an NDPA frame from a transmission STA. The reception STA receives an NDP frame from the transmission STA. The reception STA transmits a feedback frame to the transmission STA on the basis of the NDP frame. The feedback frame includes information about a feedback subcarrier for the wide band. When the wide band is a continuous 320 MHz band and the grouping value is Ng, the indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532] and [1540:Ng:2036].

13 Claims, 26 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0079027 A1* | 3/2017 | Chun .................... | H04W 72/51 |
| 2018/0331749 A1* | 11/2018 | Ghosh ...................... | H04L 1/00 |
| 2019/0261369 A1* | 8/2019 | Verma ................... | H04L 5/0048 |
| 2019/0281459 A1* | 9/2019 | Jiang ..................... | H04W 28/06 |
| 2020/0403680 A1* | 12/2020 | Li ........................ | H04B 7/0695 |

OTHER PUBLICATIONS

Chen et al., QUALCOMM, "320MHz Channelization and Tone Plan," IEEE 802.11-19/0797r0, May 2019, 12 pages.

Lou et al., Interdigital, Inc., "Feedback Overhead Analysis for 16 Spatial Stream MIMO," IEEE 802.11-19/0828r0, May 2019, 16 pages.

* cited by examiner (a)

(b)

METHOD AND DEVICE FOR TRANSMITTING FEEDBACK FRAME IN WIDE BAND IN WIRELESS LAN SYSTEM

CROSS-REFERENCE TO RELATED APPLICATIONS

This application is the National Stage filing under 35 U.S.C. 371 of International Application No. PCT/KR2020/007785, filed on Jun. 16, 2020, which claims the benefit of earlier filing date and right of priority to Korean Application No. 10-2019-0082114, filed on Jul. 8, 2019, the contents of all of which are hereby incorporated by reference herein in their entireties.

BACKGROUND OF THE DISCLOSURE

Field of the Disclosure

The present specification relates to a method for transmitting a feedback frame in a wideband in a wireless local area network (WLAN) system and, most particularly, to a method and device for configuring a feedback subcarrier for MIMO beamforming in a wideband.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY OF THE DISCLOSURE

Technical Objects

The present specification proposes a method and device for transmitting a feedback frame in a wideband in a WLAN system.

Technical Solutions

An example of the present specification proposes a method for transmitting a feedback frame in a wideband.

The present embodiment proposes a method for sounding and feeding back channel information in order to transmit a SU/MU MIMO PPDU at a wideband (240 MHz, 320 MHz band) that is supported by an EHT WLAN system. Most particularly, the present embodiment proposes a method for configuring indexes of a feedback subcarrier in channel information for configuring a precoding or beamforming matrix.

The present embodiment may be performed by a receiving station (STA), and the receiving STA may correspond to an STA or beamformee that supports an Extremely High Throughput (EHT) WLAN system. A transmitting STA of the present embodiment may correspond to an access point (AP) or beamformer.

A receiving STA receives a Null Data Packet Announcement (NDPA) frame from a transmitting STA.

The receiving STA receives a Null Data Packet (NDP) frame from the transmitting STA. And, the receiving STA may perform a sounding procedure with the transmitting STA based on the NDP.

The receiving STA transmits a feedback frame to the transmitting STA based on the NDP frame. The feedback frame may include channel information according to the sounding procedure (e.g., average SNR per space-time stream or beamforming matrix V per feedback subcarrier). The transmitting STA may generate or configure a steering matrix Q based on the channel information.

The feedback frame includes information on a feedback subcarrier for a wideband. And, the feedback subcarrier may be configured based on a bandwidth and tone plan of the wideband.

For example, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036]. Herein, at this point, [A:Ng:B] indicates that indexes of the feedback subcarrier are set from A to B at a spacing of Ng.

Effects of the Disclosure

According to an embodiment proposed in the present specification, by designing a feedback subcarrier included in channel information that is fed back for transmitting an SU/MU MIMO PPDU by using a contiguous or non-contiguous 160 MHz, 240 MHz or 320 MHz band, a new effect of increasing channel information transmission efficiency and overall throughput for beamforming in a wideband may be achieved.

DESCRIPTION OF EXEMPLARY EMBODIMENTS

Figure 1:
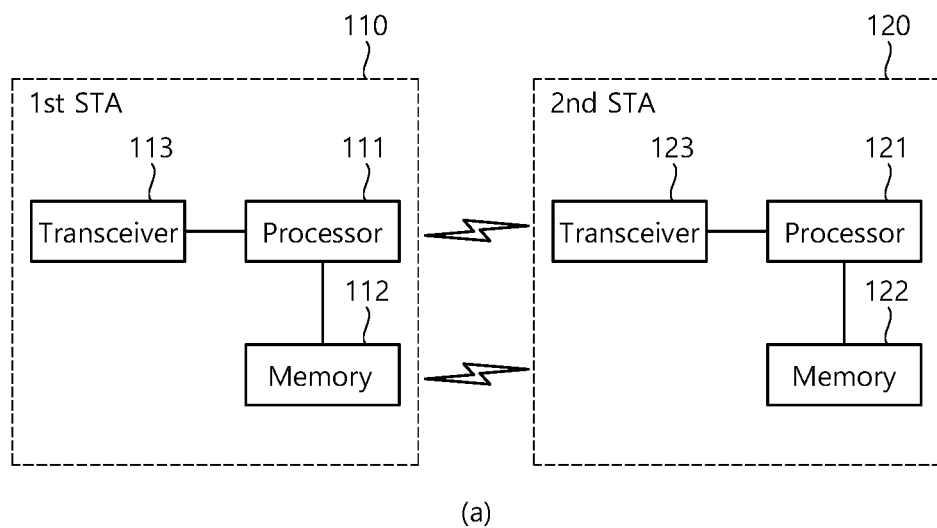
FIG. 1 shows an example of a transmitting apparatus and/or receiving apparatus of the present specification.
Figure 1:
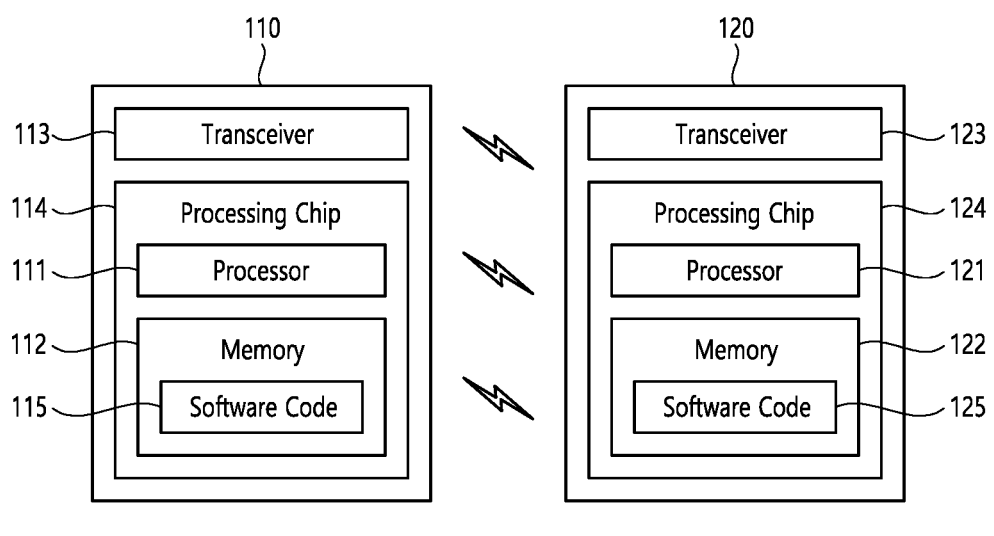

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
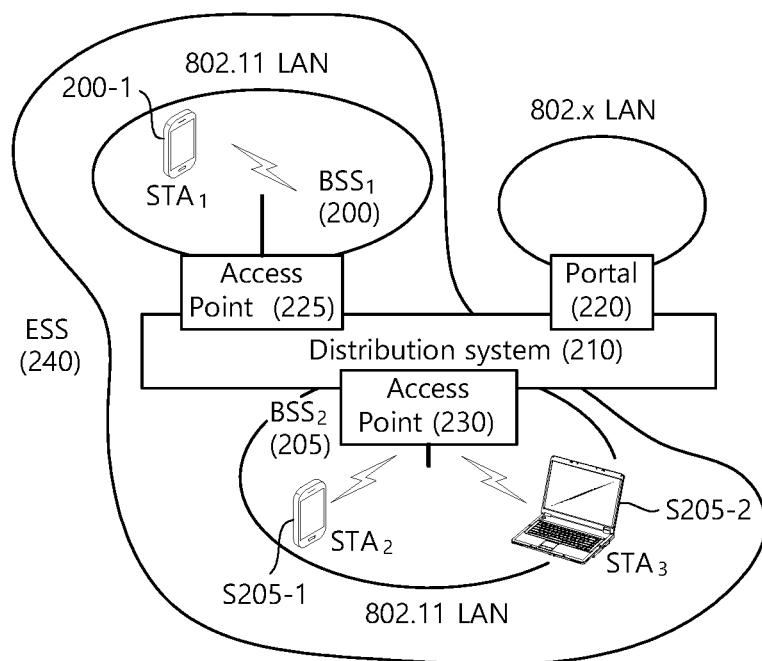
FIG. 2 is a conceptual view illustrating the structure of a wireless local area network (WLAN).
Figure 2:
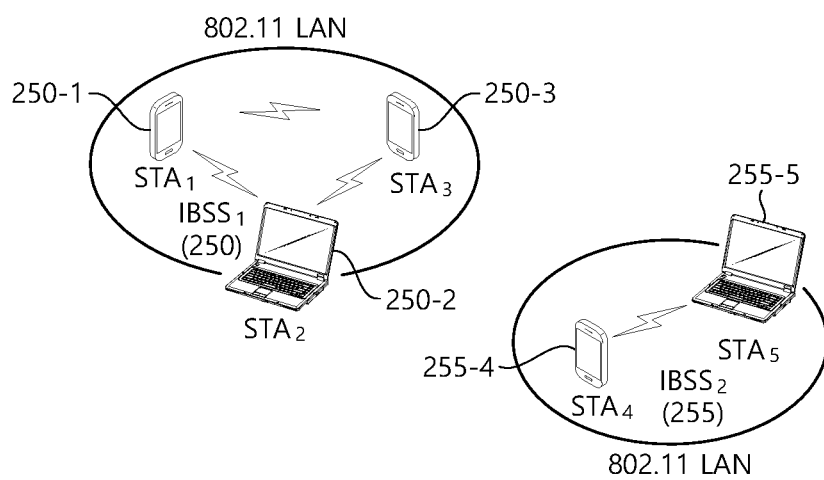

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IB SS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
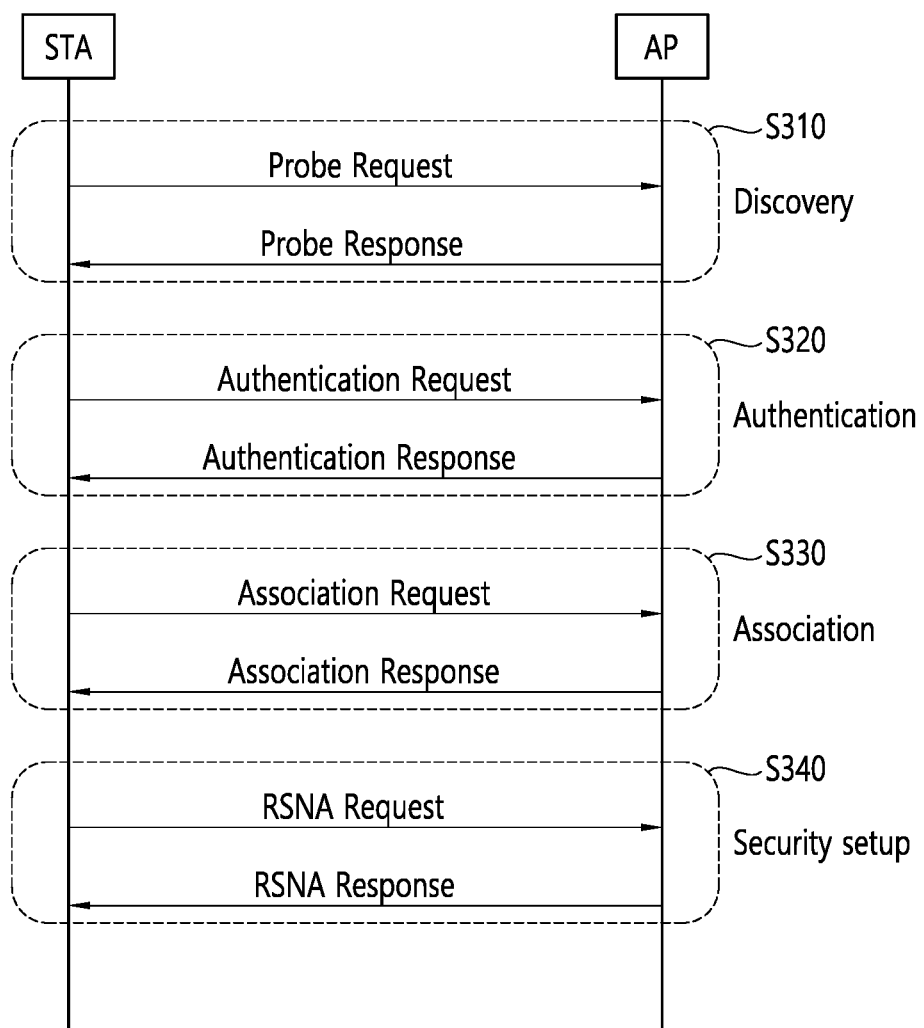
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
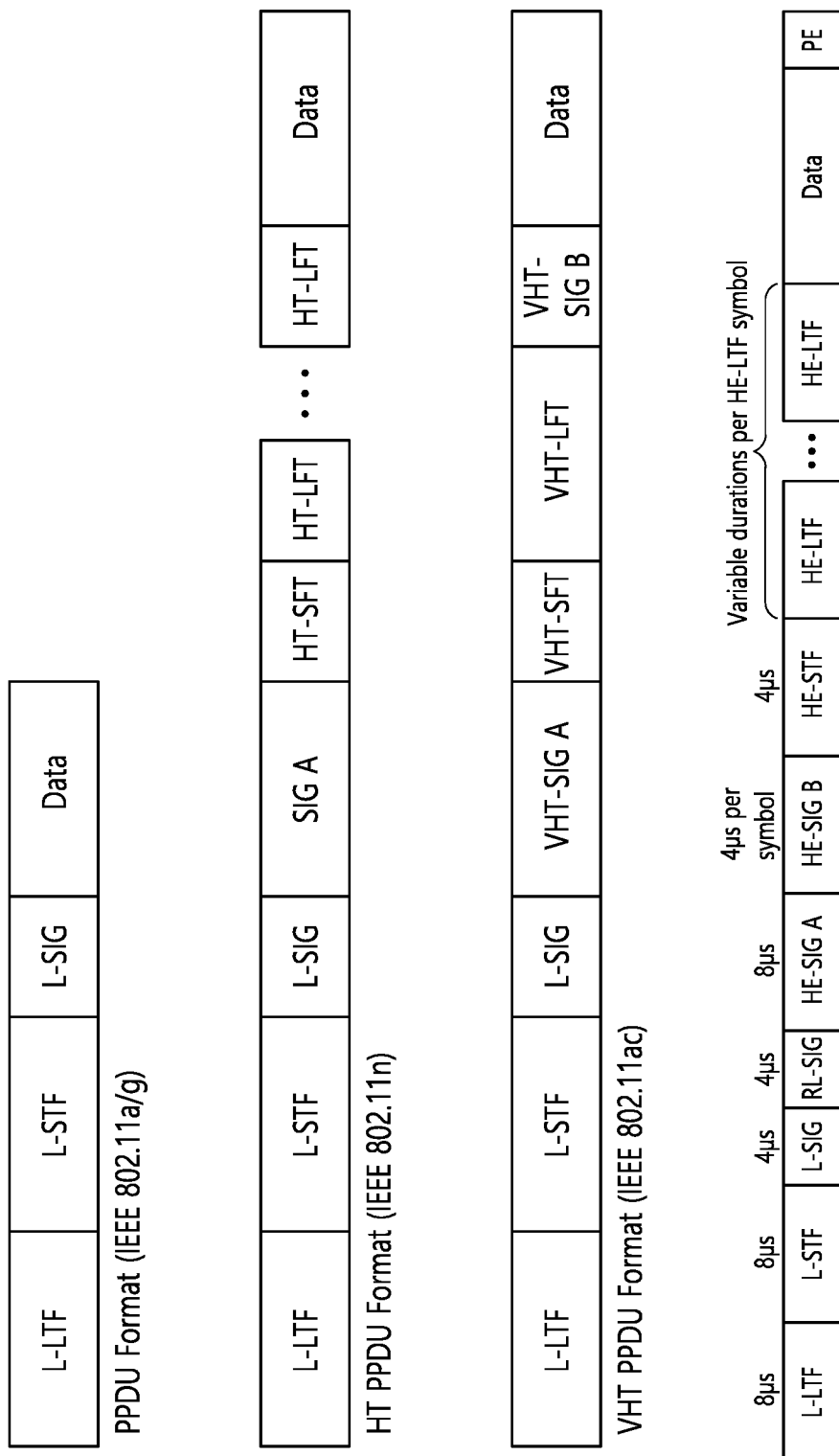
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
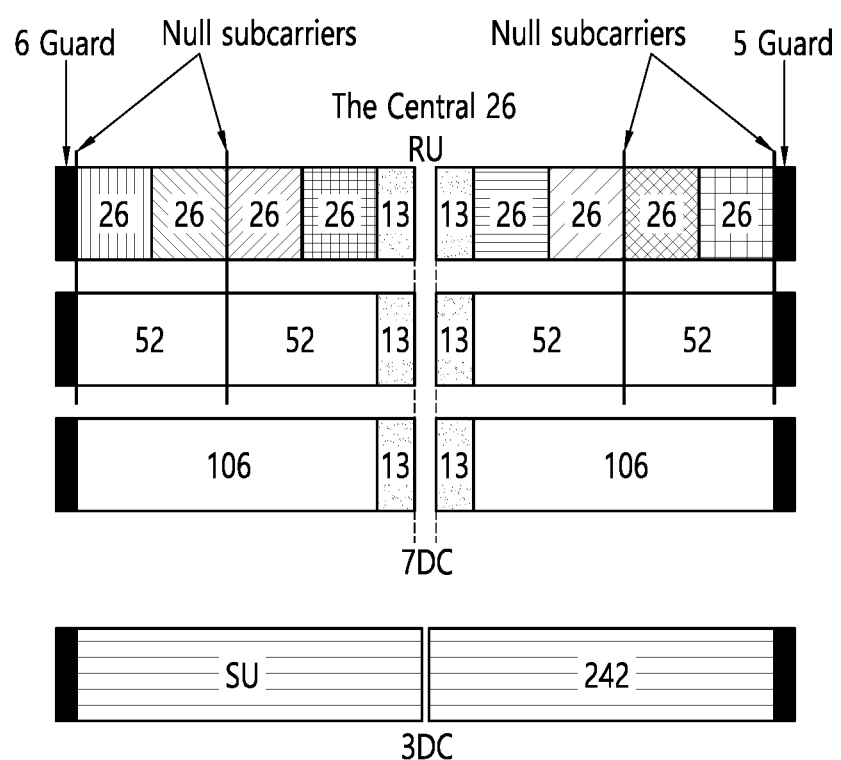
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
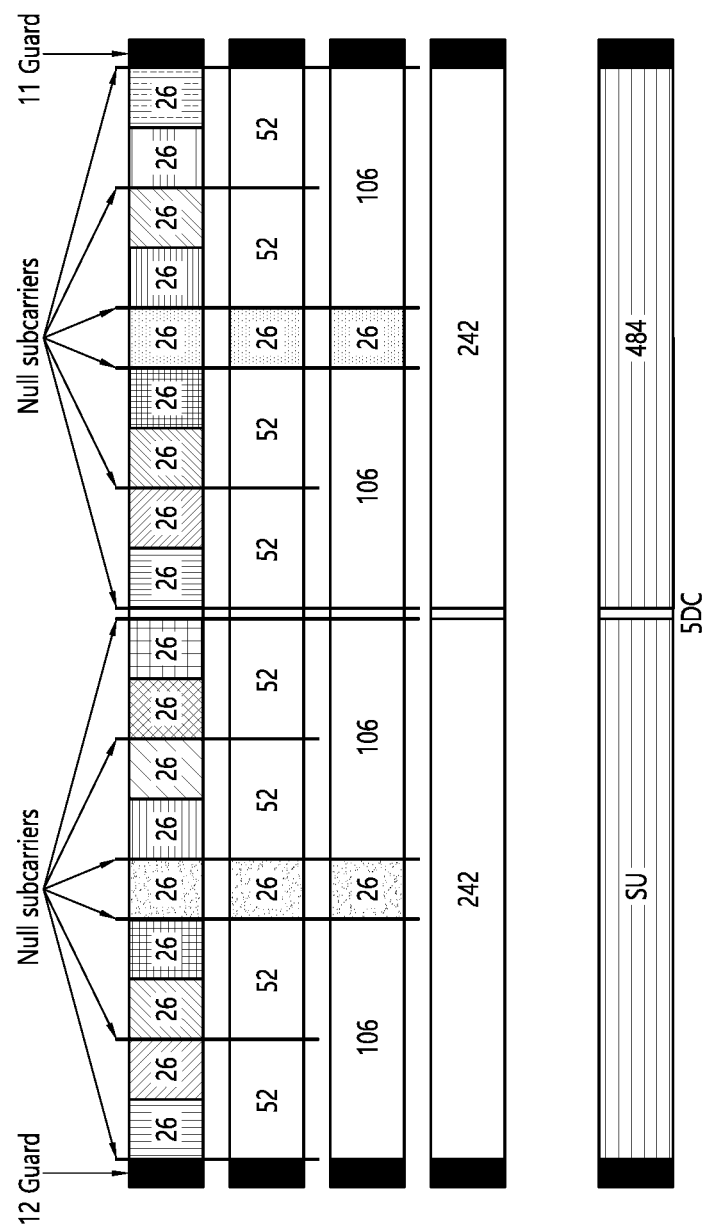
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
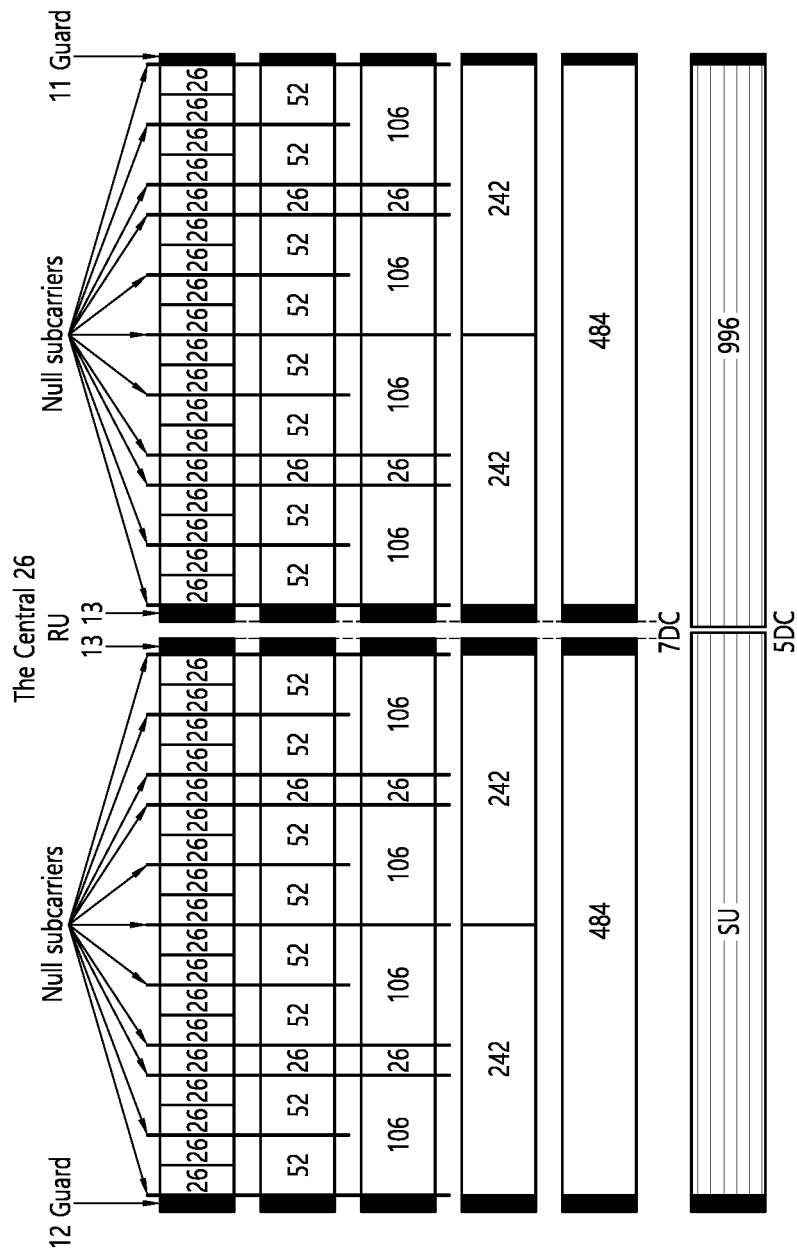
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
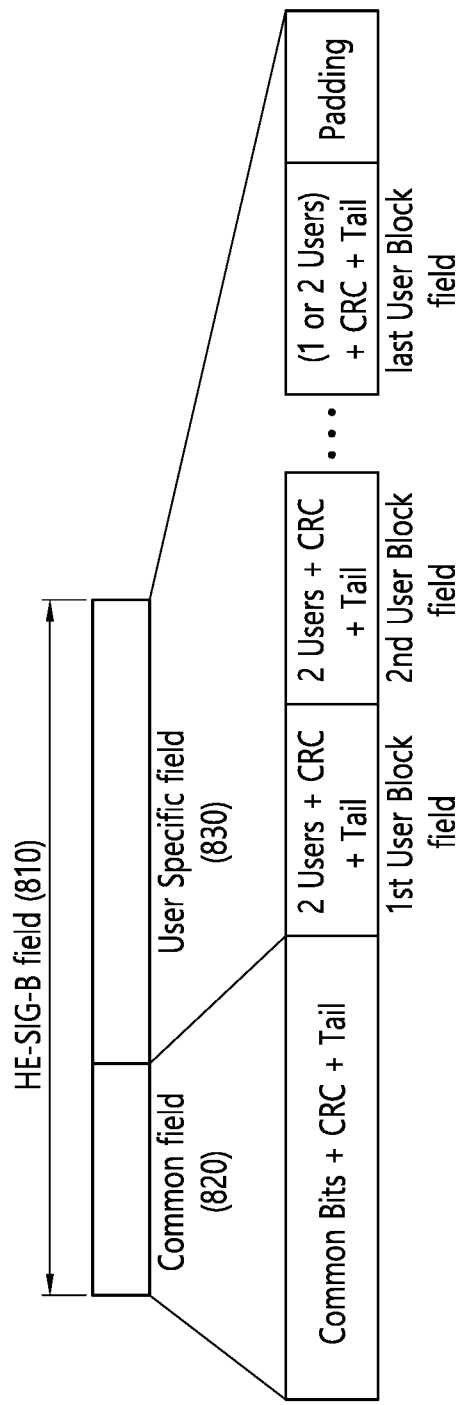
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
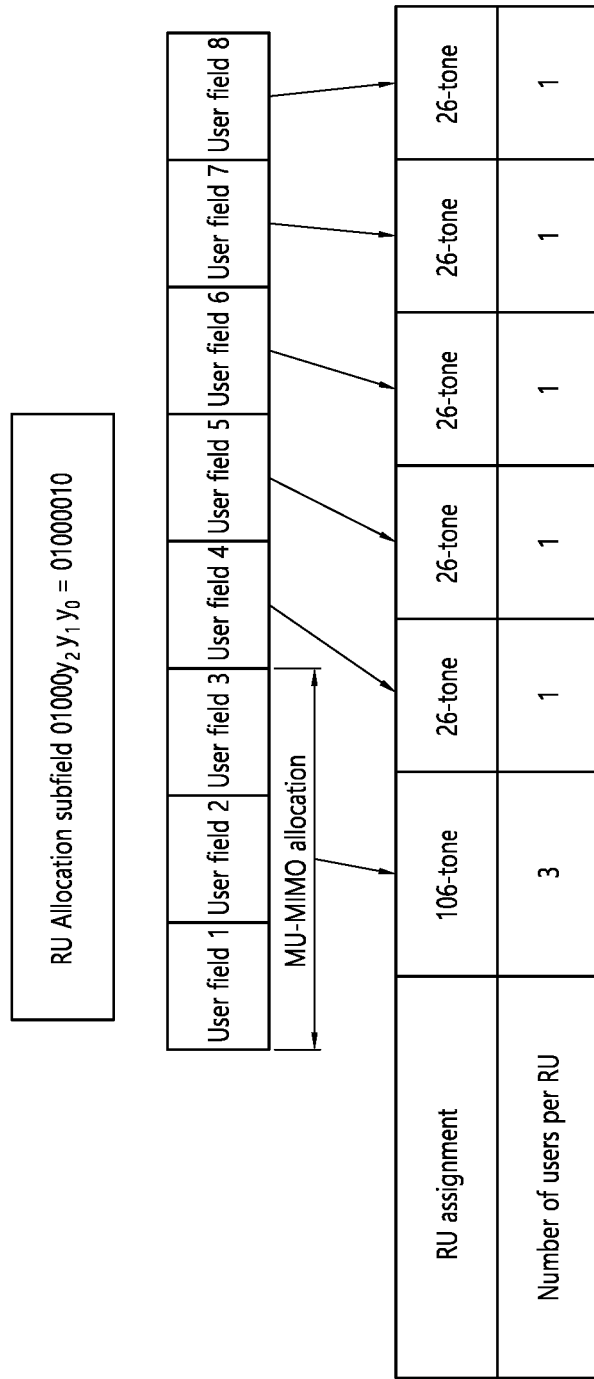
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16QAM, 64QAM, 256QAM, 1024QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
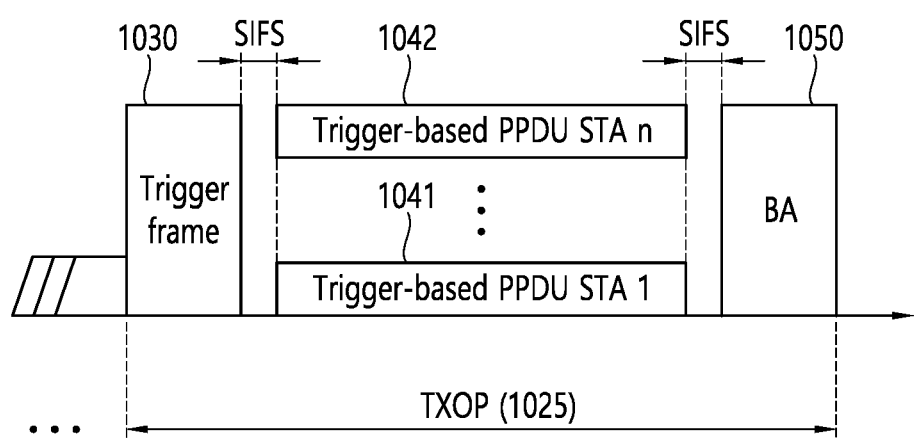
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
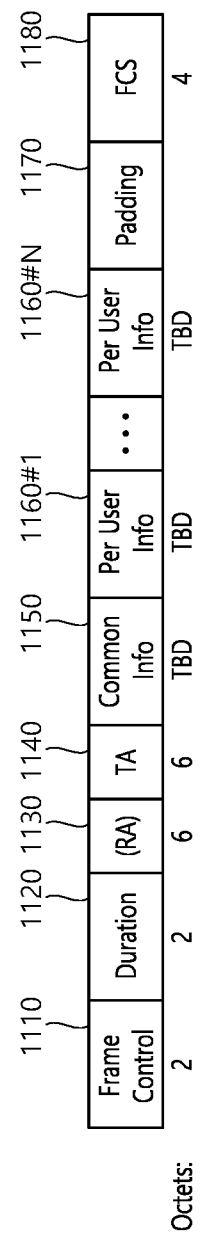
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
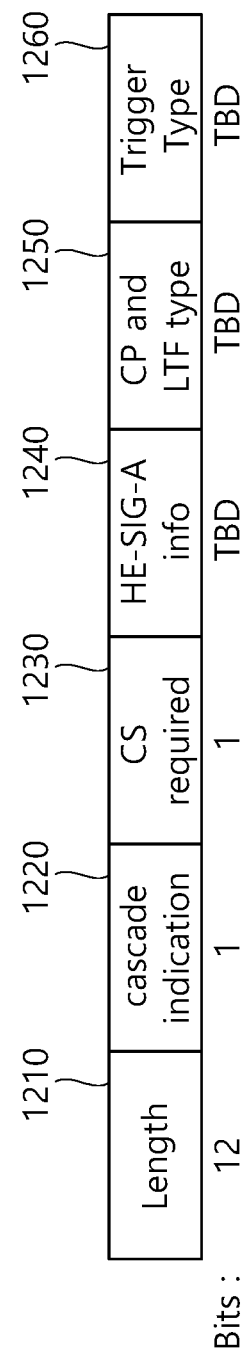
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
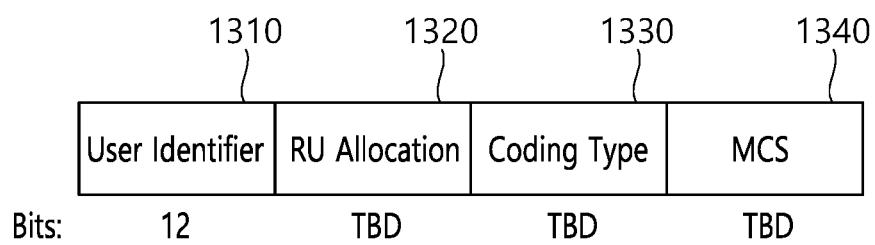
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
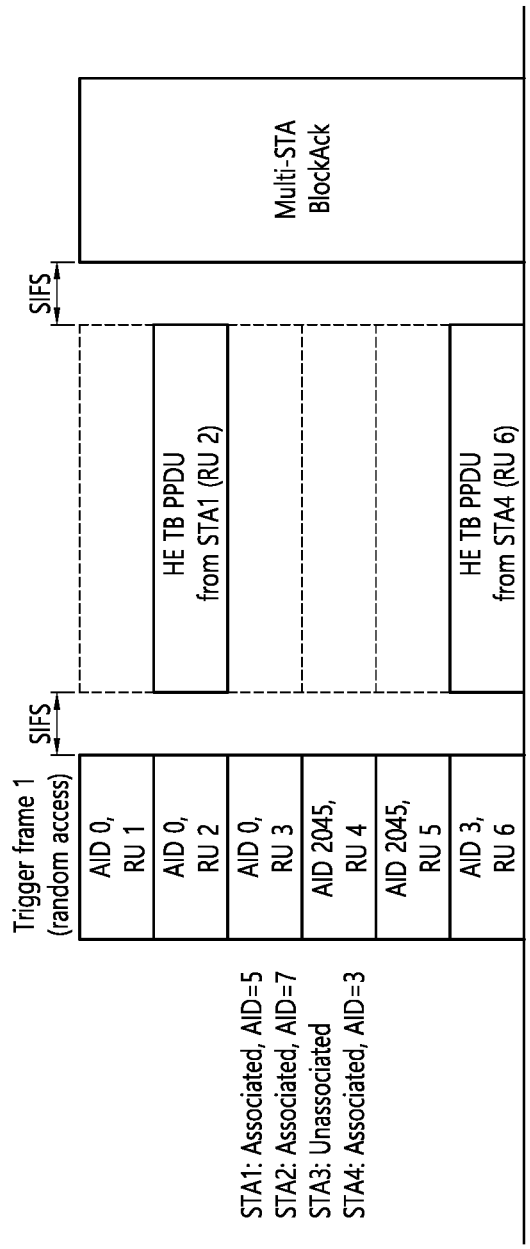
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource AID 0, RU 1), a 2nd RU resource AID 0, RU 2), a 3rd RU resource AID 0, RU 3), a 4th RU resource AID 2045, RU 4), a 5th RU resource AID 2045, RU 5), and a 6th RU resource AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
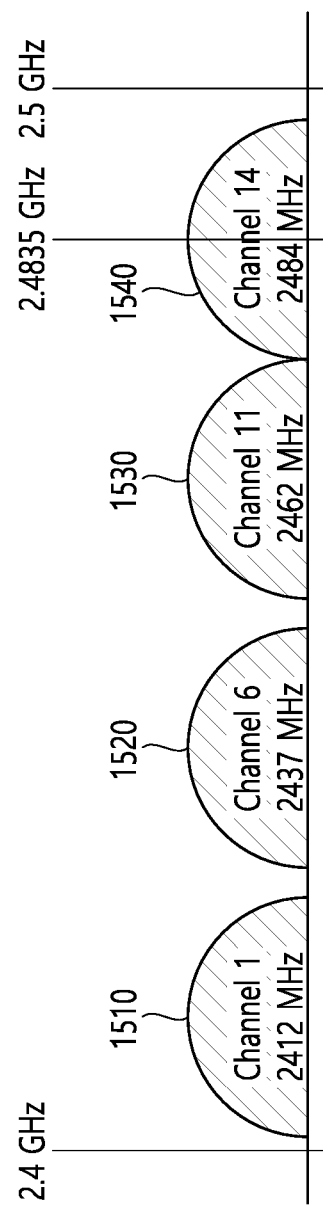
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
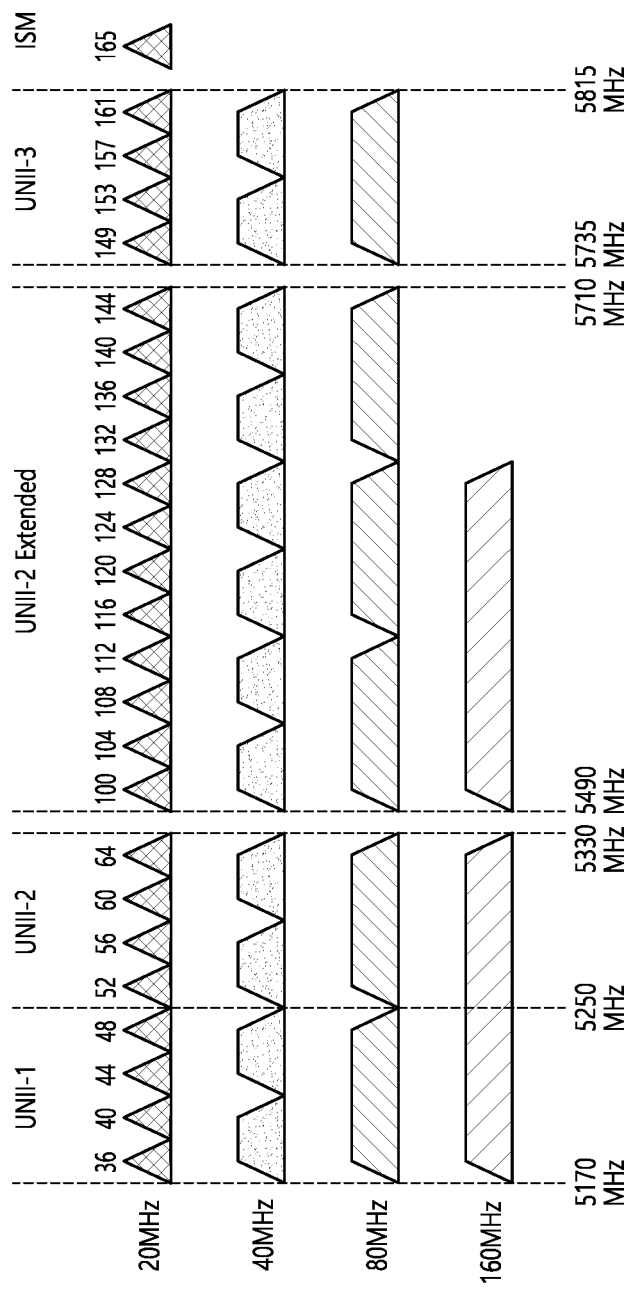
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
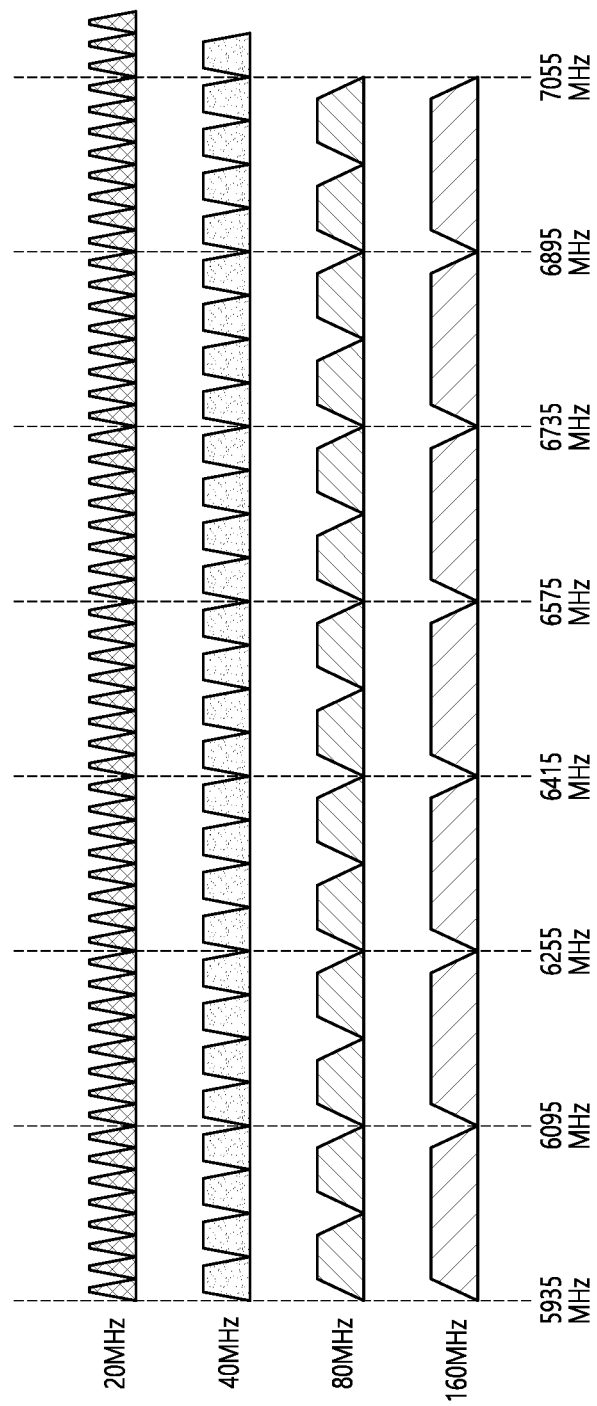
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be referred to as various terms, such as EHT PPDU, transmitting PPDU, receiving PPDU, first type or Nth type PPDU, and so on. For example, in the present specification, PPDU or EHT PPDU may be referred to by using various terms, such as transmission PPDU, reception PPDU, first type or Nth type PPDU, and so on. Additionally, the EHT PPDU may be used in an EHT system and/or a new WLAN system, which is an enhanced version of the EHT system.

The PPDU of FIG. 18 may represent part or all of a PPDU type that is used in an EHT system. For example, the example of FIG. 18 may be used for both single-user (SU) mode and multi-user (MU) mode, or may be used only for the SU mode, or may be used only for the MU mode. For example, in the EHT system, a trigger-based (TB) PPDU may be separately defined or may be configured based on an example of FIG. 18. A trigger frame and UL-MU operations that are started by the trigger frame (e.g., transmitting operations of the TB PPDU), which are described by at least one of FIG. 10 to FIG. 14, may be directly applied to the EHT system without modification.

In FIG. 18, L-STF to EHT-LTF may be referred to as a preamble or physical preamble, and the L-STF to EHT-LTF may be generated/transmitted/received/obtained/decoded in a physical layer.

Subcarrier spacing of the L-LTF, L-STF, L-SIG, RL-SIG, U-SIG, and EHT-SIG fields of FIG. 18 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 18, L-LTF and L-STF may be the same as the fields of the prior art (or related art).

The L-SIG field of FIG. 18 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a PPDU length or time duration. For example, a value of the 12-bit Length field may be determined based on a type of the PPDU. For example, in case the PPDU is a non-HT PPDU, an HT PPDU, a VHT PPDU, or an EHT PPDU, the value of the Length field may be determined as a multiple of 3. For example, in case the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

For example, a transmitting STA may apply BCC encoding, which is based on a 1/2-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier {Subcarrier indexes −21, −7, +7, +21} and a DC subcarrier {Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

A Universal SIG (U-SIG) may be inserted after the RL-SIG of FIG. 18. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

For example, A-bit information (e.g., 52 un-coded bits) may be transmitted through the U-SIG (or U-SIG field), and a first symbol of the U-SIG may transmit first X-bit information (e.g., 26 un-coded bits) among the total of A bits of the corresponding information, and a second symbol of the U-SIG may transmit remaining Y-bit information (e.g., 26 un-coded bits) of the A-bit information. For example, the transmitting STA may obtain 26 un-coded bits that are included in each U-SIG symbol. The transmitting STA may perform convolutional encoding (i.e., BCC encoding) based on a rate of R=1/2 so as to generate 52-coded bits, and, then, the transmitting STA may perform interleaving on the 52-coded bits. The transmitting STA may perform BPSK modulation on the interleaved 52-coded bits, so as to generate 52 BPSK symbols that are allocated to each U-SIG symbol. One U-SIG symbol may be transmitted based on 56 tones (subcarriers) starting from subcarrier index −28 to subcarrier index +28, with the exception for DC index 0. The 52 BPSK symbols that are generated by the transmitting STA may be transmitted based on the remaining tones (subcarriers) excluding the pilot tones −21, −7, +7, +21 tones.

For example, the A-bit information (e.g., 52 un-coded bits) may include a CRC field (e.g., 4-bit length field) and a Tail field (e.g., 6-bit length field). The CRC field and the Tail field may be transmitted through the second symbol of the U-SIG. The CRC field may be generated based on the 26 bits being allocated to the first symbol of the U-SIG and the remaining 16 bits excluding the CRC/Tail fields from the second symbol. And, the CRC field may be generated based on the related art CRC calculation algorithm. Additionally, the Tail field may be used for terminating a trellis of a convolutional decoder and may, for example, be configured as "000000".

The A-bit information (e.g., 52 un-coded bits) being transmitted by the U-SIG (or U-SIG field) may be divided into version-independent bits and version-dependent bits. For example, a size of the version-independent bits may be fixed or variable. For example, the version-independent bits may be allocated only to the first symbol of the U-SIG or may be allocated to both the first and second symbols of the U-SIG. For example, the version-independent bits and the version-dependent bits may be referred to by using various terms, such as a first control bit and a second control bit.

For example, the version-independent bits of the U-SIG may include a 3-bit PHY version identifier. For example, the 3-bit PHY version identifier may include information related to the PHY version of the transmission/reception PPDU. For example, a first value of the 3-bit PHY version identifier may indicate that the transmission/reception PPDU is an EHT PPDU. In other words, when the transmitting STA transmits the EHT PPDU, the transmitting STA may set the 3-bit PHY version identifier to the first value. In other words, based on the PHY version identifier having the first value, the receiving STA may determine that the reception PPDU is an EHT PPDU.

For example, the version-independent bits of the U-SIG may include a 1-bit UL/DL flag field. A first value of the 1-bit UL/DL flag field is related to UL communication, and a second value of the 1-bit UL/DL flag field is related to DL communication.

For example, the version-independent bits of the U-SIG may include information related to the length of a TXOP, and information related to BSS color ID.

For example, in case the EHT PPDU is divided into various types (e.g., EHT PPDU related to SU mode, EHT PPDU related to MU mode, EHT PPDU related to a Trigger Frame, EHT PPDU related to Extended Range transmission, and so on), information related to the EHT PPDU type may be included in the version-dependent bits of the U-SIG.

For example, the U-SIG may include information related to 1) a bandwidth field including information related to a bandwidth, 2) a field including information related to an MCS scheme being applied to the EHT-SIG, 3) an indication field including information related to whether or not a dual subcarrier modulation (DCM) scheme is applied to the EHT-SIG, 4) a field including information related to a number of symbols being used for the EHT-SIG, 5) a field including information related to whether or not the EHT-SIG is generated throughout the whole band, 6) a field including information related to an EHT-LTF/STF type, 7) a field indicating an EHT-LTF length and a CP length.

Preamble puncturing may be applied to the PPDU of FIG. 18. Preamble puncturing means applying puncturing to a partial band (e.g., a Secondary 20 MHz band) of the whole band of a PPDU. For example, when an 80 MHz PPDU is transmitted, the STA may apply puncturing to a secondary 20 MHz band of the 80 MHz band and may transmit the PPDU only through a primary 20 MHz band and a secondary 40 MHz band.

For example, a pattern of preamble puncturing may be preset (or predetermined). For example, when a first puncturing pattern is applied, the puncturing may be applied only for a secondary 20 MHz band within the 80 MHz band. For example, when a second puncturing pattern is applied, the puncturing may be applied to only one of the two secondary 20 MHz bands that are included in the secondary 40 MHz band within the 80 MHz band. For example, when a third puncturing pattern is applied, the puncturing may be applied only to a secondary 20 MHz band that is included in a primary 80 MHz band within a 160 MHz band (or 80+80 MHz band). For example, when a fourth puncturing pattern is applied, and when a primary 40 MHz band that is included in a primary 80 MHz band within a 160 MHz band (or 80+80 MHz band) is present, the puncturing may be applied to at least one 20 MHz channel that does not belong to the primary 40 MHz band.

Information related to the preamble puncturing that is applied to the PPDU may be included in the U-SIG and/or EHT-SIG. For example, a first field of the U-SIG may include information related to a contiguous bandwidth of the PPDU, and a second field of the U-SIG may include information related to preamble puncturing that is applied to the PPDU.

For example, the U-SIG and EHT-SIG may include information related to preamble puncturing based on the following method. When the bandwidth of a PPDU exceeds 80 MHz, the U-SIG may be separately configured in 80 MHz units. For example, when the bandwidth of a PPDU is 160 MHz, a first U-SIG for a first 80 MHz band and a second U-SIG for a second 80 MHz band may be included in the corresponding PPDU. In this case, a first field of the first U-SIG may include information related to the 160 MHz bandwidth, and a second field of the first U-SIG may include information related to preamble puncturing (i.e., information related to a preamble puncturing pattern) that is applied to the first 80 MHz band. Additionally, a first field of the second U-SIG may include information related to the 160 MHz bandwidth, and a second field of the second U-SIG may include information related to preamble puncturing (i.e., information related to a preamble puncturing pattern) that is applied to the second 80 MHz band. Meanwhile, an EHT-SIG that is contiguous to the first U-SIG may include information related to preamble puncturing (i.e., information related to a preamble puncturing pattern) that is applied to the second 80 MHz band, and an EHT-SIG that is contiguous to the second U-SIG may include information related to preamble puncturing (i.e., information related to a preamble puncturing pattern) that is applied to the first 80 MHz band.

Additionally or alternatively, the U-SIG and EHT-SIG may include information related to preamble puncturing based on the following method. The U-SIG may include information related to preamble puncturing (i.e., information related to a preamble puncturing pattern) for all bands. That is, the EHT-SIG may not include information related to preamble puncturing, and only the U-SIG may include information related to preamble puncturing (i.e., information related to a preamble puncturing pattern).

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 18 may include the technical features of an HE-SIG-B, which is indicated in the examples of FIG. 8 to FIG. 9, as they are. The EHT-SIG may also be referred to by using various terms, such as a second SIG field, a second SIG, a second-type SIG, a control signal, a control signal field, a second (type) control signal, and so on.

The EHT-SIG may include N-bit information (e.g., 1-bit information) related to whether an EHT PPDU supports the SU mode or whether an EHT PPDU supports the MU mode.

The EHT-SIG may be configured based on various MCS schemes. As described above, the information related to the MCS scheme being applied to the EHT-SIG may be included in the U-SIG. The EHT-SIG may be configured based on a DCM scheme. For example, among N number of data tones (e.g., 52 data tones) that are allocated for the EHT-SIG, a first modulation scheme may be applied to one half of contiguous tones, and a second modulation scheme may be applied to the remaining half of contiguous tones. That is, the transmitting STA may modulate specific control information to a first symbol based on the first modulation scheme and may allocate the modulated first symbol to one half of contiguous tones. Thereafter, the transmitting STA may modulate the same control information to a second symbol based on the second modulation scheme and may allocated the modulated second symbol to the other half of contiguous tones. As described above, information related to whether or not the DCM scheme is applied to the EHT-SIG (e.g., 1 bit field) may be included in the U-SIG. EHT-STF of FIG. 18 may be used for enhancing automatic gain control estimation in a multiple input multiple output (MIMO) environment or OFDMA environment. And, EHT-LTF of FIG. 18 may be used for estimating a channel in a MIMO environment or OFDMA environment.

The EHT-STF may be set to various types. For example, among the STFs, a first type (i.e., 1x STF) may be generated based on a first type STF sequence in which non-zero coefficients are positioned at 16 subcarrier spacings. An STF signal that is generated based on the first type STF sequence may have a periodicity (or cycle period) of 0.8 μs. And, the signal having the periodicity of 0.8 μs may be repeated 5 times and become a first type STF having a length of 4 μs. For example, among the STFs, a second type (i.e., 2× STF) may be generated based on a second type STF sequence in which non-zero coefficients are positioned at 8 subcarrier spacings. An STF signal that is generated based on the second type STF sequence may have a periodicity (or cycle period) of 1.6 μs. And, the signal having the periodicity of 1.6 μs may be repeated 5 times and become a second type STF having a length of 8 μs. Hereinafter, an example of a sequence (i.e., EHT-STF sequence) for configuring an EHT-STF will be proposed. The following sequence may be modified to various types.

The EHT-STF may be configured based on the following M sequence.

$$M=\{-1,-1,-1,1,1,1,-1,1,1,1,-1,1,1,-1,1\} \quad \text{<Equation 1>}$$

An EHT-STF for a 20 MHz PPDU may be configured based on the following equation. The example shown below may be a first type (i.e., 1× STF) sequence. For example, the first type sequence may be included in an EHT-PPDU and not a trigger-based (TB) PPDU. In the following equation, (a:b:c) may denote durations being defined at b tone spacings (i.e., subcarrier spacings) starting from an a tone index (i.e., subcarrier index) to a c tone index. For example, Equation 2 shown below may represent a sequence that is defined at 16 tone spacings starting from tone index −112 to tone index 112. For an EHT-STF, since subcarrier spacing of 78.125 kHz is applied, the 16 tone spacings may mean that EHT-STF coefficients (or elements) are positioned at 78.125*16=1250 kHz intervals (or spacings). Additionally, * means multiplication (i.e., 'multiplied by'), and sqrt( ) means square root.

$$\text{EHT-STF}(-112:16:112)=\{M\}*(1+j)/\text{sqrt}(2) \quad \text{<Equation 2>}$$

An EHT-STF for a 40 MHz PPDU may be configured based on the following equation. The example shown below may be a first type (i.e., 1× STF) sequence.

$$\text{EHT-STF}(-240:16:240)=\{M,0,-M\}*(1+j)/\text{sqrt}(2) \quad \text{<Equation 3>}$$

An EHT-STF for an 80 MHz PPDU may be configured based on the following equation. The example shown below may be a first type (i.e., 1× STF) sequence.

$$\text{EHT-STF}(-496:16:496)=\{M,1,-M,0,-M,1,-M\}*(1+j)/\text{sqrt}(2) \quad \text{<Equation 4>}$$

An EHT-STF for a 160 MHz PPDU may be configured based on the following equation. The example shown below may be a first type (i.e., 1× STF) sequence.

$$\text{EHT-STF}(-1008:16:1008)=\{M,1,-M,0,-M,1,-M,0,-M,-1,M,0,-M,1,-M\}*(1+j)/\text{sqrt}(2) \quad \text{<Equation 5>}$$

In the EHT-STF for an 80+80 MHz PPDU, a sequence for a lower 80 MHz may be the same as Equation 4. And, in the EHT-STF for the 80+80 MHz PPDU, a sequence for a higher 80 MHz may be configured based on the following equation.

$$\text{EHT-STF}(-496{:}16{:}496) = \{-M,-1,M,0,-M,1,-M\}^* (1+j)/\text{sqrt}(2) \quad \text{<Equation 6>}$$

Hereinafter, Equation 7 to Equation 11 relate to examples of a second type (i.e., 2× STF) sequence.

$$\text{EHT-STF}(-120{:}8{:}120) = \{M,0,-M\}^*(1+j)/\text{sqrt}(2) \quad \text{<Equation 7>}$$

An EHT-STF for a 40 MHz PPDU may be configured based on the following equation.

$$\text{EHT-STF}(-248{:}8{:}248) = \{M,-1,-M,0,M,-1,M\}^*(1+j)/\text{sqrt}(2) \quad \text{<Equation 8>}$$

EHT-STF(−248)=0
EHT-STF(248)=0

An EHT-STF for an 80 MHz PPDU may be configured based on the following equation.

$$\text{EHT-STF}(-504{:}8{:}504) = \{M,-1,M,-1,-M,-1,M,0,-M,1,M,1,-M,1,-M\}^*(1+j)/\text{sqrt}(2) \quad \text{<Equation 9>}$$

An EHT-STF for a 160 MHz PPDU may be configured based on the following equation.

$$\text{EHT-STF}(-1016{:}16{:}1016) = \{M,-1,M,-1,-M,-1,M,0,-M,1,M,1,-M,1,-M,0,-M,1,-M,1,M,1,-M,0,-M,1,M,1,-M,1,-M\}^*(1+j)/\text{sqrt}(2) \quad \text{<Equation 10>}$$

EHT-STF(−8)=0, EHT-STF(8)=0,
EHT-STF(−1016)=0, EHT-STF(1016)=0

In the EHT-STF for an 80+80 MHz PPDU, a sequence for a lower 80 MHz may be the same as Equation 9. And, in the EHT-STF for the 80+80 MHz PPDU, a sequence for a higher 80 MHz may be configured based on the following equation.

$$\text{EHT-STF}(-504{:}8{:}504) = \{-M,1,-M,1,M,1,-M,0,-M,1,M,1,-M,1,-M\}^*(1+j)/\text{sqrt}(2) \quad \text{<Equation 11>}$$

EHT-STF(−504)=0,
EHT-STF(504)=0

An EHT-LTF may have first, second, and third types (i.e., 1×, 2×, 4× LTF). For example, the first/second/third type LTF may be generated based on an LTF sequence in which non-zero coefficients are positioned at 4/2/1 subcarrier spacing(s). The first/second/third type LTF may have a time length of 3.2/6.4/12.8 μs. Additionally, various lengths of GI (e.g., 0.8/1/6/3.2 μs) may be applied to the first/second/third type LTF.

Information related to an STF and/or LTF type (including information related to GI that is applied to the LTF) may be included in an SIG A field and/or SIG B field of FIG. 18.

The PPDU (i.e., EHT-PPDU) of FIG. 18 may be configured based on examples of FIG. 5 and FIG. 6.

For example, an EHT PPDU being transmitted over a 20 MHz band, i.e., a 20 MHz EHT PPDU, may be configured based on RUs of FIG. 5. That is, the location of an RU of the EHT-STF, EHT-LTF, data field being included in the EHT PPDU may be determined as shown in FIG. 5.

An EHT PPDU being transmitted over a 40 MHz band, i.e., a 40 MHz EHT PPDU, may be configured based on RUs of FIG. 6. That is, the location of an RU of the EHT-STF, EHT-LTF, data field being included in the EHT PPDU may be determined as shown in FIG. 6.

Since the RU location of FIG. 6 corresponds to 40 MHz, if the pattern of FIG. 6 is repeated two times, a tone plan for 80 MHz may be determined. That is, an 80 MHz EHT PPDU may be transmitted based on a new tone plan in which the RU of FIG. 6 is repeated two times, and not the RU of FIG. 7.

In case the pattern of FIG. 6 is repeated two times, 23 tones (i.e., 11 guard tones+12 guard tones) may be configured in a DC region. That is, a tone plan for an 80 MHz EHT PPDU being allocated based on OFDMA may have 23 DC tones. On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

A tone plan for 160/240/320 MHz may be configured to have a format of repeating the pattern of FIG. 6 multiple times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
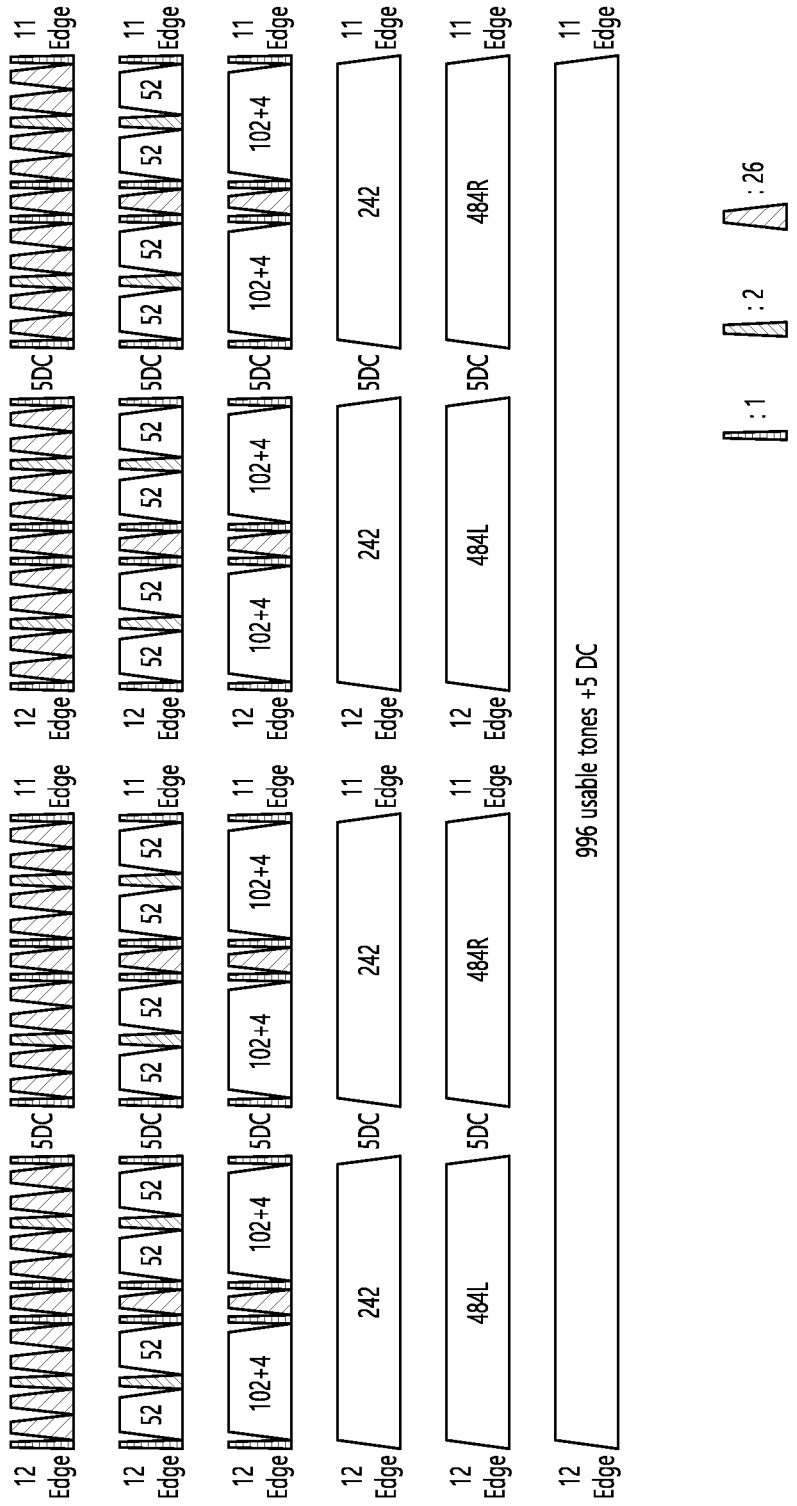
FIG. 19 shows a tone plan for an 80 MHz band in an EHT WLAN system.

FIG. 19 shows a tone plan for an 80 MHz band in an EHT WLAN system.

As described above, in the EHT WLAN system, a tone plan for an 80 MHz band may be defined by repeating two times a tone plan for 40 MHz (RU pattern of FIG. 6) that is defined in the 802.11ax WLAN system by using a detailed RU pattern.

Referring to FIG. 19, a tone plan for the 80 MHz EHT PPDU that is allocated based on OFDMA may have 23 DC tones (i.e., 11 guard tones+12 guard tones). Additionally, 1 or 2 null tone(s) (or null subcarrier(s)) may be inserted in-between 26 RUs, 52 RUs, 106 RUs (shown as 102+4 RUs). FIG. 19 more specifically shows positions and number of null subcarriers shown FIG. 6.

Additionally, left-side 484 RUs and right-side 484 RUs may all include 5 DC tones at a center part. In the left-side 484 RUs, an RU that is positioned on a left side of the center DC tone is indicated as 484L, and an RU that is positioned on a right side of the center DC tone is indicated as 484R. Similarly, in the right-side 484 RUs, an RU that is positioned on a left side of the center DC tone is indicated as 484L, and an RU that is positioned on a right side of the center DC tone is indicated as 484R.

On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

In the EHT WLAN system, a tone plan for 160/240/320 MHz may be configured to have a format of repeating the pattern of FIG. 19 multiple times.

1. Tone Plan in 802.11ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in flax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the flax standard, the subcarrier frequency spacing is 312.5 kHz or 78.125 kHz, and the subcarrier frequency spacing for the RU is 78.125 kHz. That is, a subcarrier index +1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
| --- | --- | --- |
| 20 MHz | 26, 52 | ±69, ±122 |
| | 106 | none |
| | 242 | none |
| 40 MHz | 26, 52 | ±3, ±56, +57, ±110, ±137, ±190, ±191, +244 |
| | 106 | ±3, ±110, ±137, ±244 |
| | 242, 484 | none |
| 80 MHz | 26, 52 | ±17, ±70, ±71, ±124, ±151, ±204, ±205, ±258, ±259, ±312, ±313, ±366, ±393, +446, ±447, ±500 |
| | 106 | ±17, ±124, ±151, ±258, ±259, ±366, ±393, ±500 |
| | 242, 484 | none |
| | 996 | none |
| 160 MHz | 26, 52, 106 | {null subcarrier indices in 80 MHz − 512, null subcarrier indices in 80 MHz + 512} |
| | 242, 484, 096, 2 × 996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4× HE-LTF. In 1× HE-LTF, the location of the pilot sequence in HE-LTF is configured based on pilot subcarriers for a data field multiplied 4 times. If the pilot subcarrier exists in 2× HE-LTF, the location of the pilot subcarrier shall be the same as a location of a pilot in a 4× data symbol. All pilot subcarriers are located at even-numbered indices listed below.

At 160 MHz or 80+80 MHz, the location of the pilot subcarrier shall use the same 80 MHz location for 80 MHz of both sides.

3. High Efficiency (HE) Sounding Protocol

Figure 20:
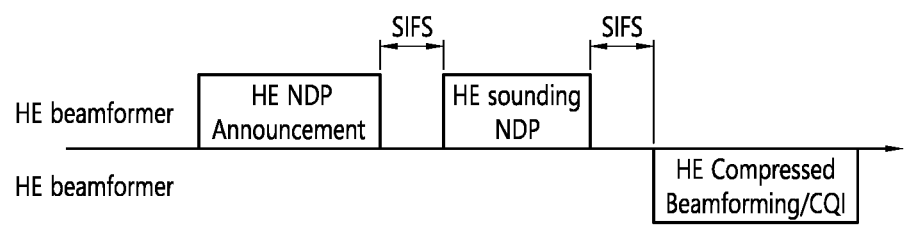
FIG. 20 shows an example of an HE sounding protocol.

FIG. 20 shows an example of an HE sounding protocol.

Referring to FIG. 20, an HE beamformer transmits an HE NDP announcement frame for requesting compressed beamforming and, then, transmits an HE sounding null data packet (NDP) in which data does not exist. Thereafter, an HE beamformee estimates a channel through the HE sounding NDP and, then, transmits information for compressed

| Channel Width | RU Size | Pilot Subcarrier Indites |
| --- | --- | --- |
| 20 MHz | 26, 52 | ±10, ±22, ±36, ±48, ±62, ±76, ±90, ±102, ±116 |
| | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
| | 106, 242, 484 | ±10, ±36, ±78, ±104, ±144, ±170, ±212, ±238 |
| 80 MHz | 26, 52 | ±10, ±24, +38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
| | 106, 242,484 | ±24, ±50, ±92, ±118, ±158, ±184, ±226, ±252, ±266, ±292, ±334, ±360, ±400, ±426, ±468, ±494 |
| | 996 | ±24, ±92, ±158, ±226, ±266, ±334, ±400, ±468 |
| 160 MHz | 26,52. 106,242, 484 | {pilot subcarrier indices in 80 MHz − 512, pilot subcarrier indices in 80 MHz + 512} |
| | 996 | {for the lower 80 MHz, pilot subcarier indices in 80 MHz − 512, for the upper 80 MHz, pilot subcarrier indices in 80 MHz + 512} | beamforming. Apart from a short inter frame space (SIFS), another inter frame space (IFS) may be considered as an interval between each frame.

That is, the HE beamformee estimates a channel by using a training signal (e.g., HE sounding NDP) that is transmitted by the HE beamformer and feeds back a measurement value of a channel status. The HE beamformer uses the fed back measurement value to derive a steering matrix.

The HE beamformee feeds back a measurement value of a channel status within an HE compressed beamforming/CQI report through a HE compressed beamforming/CQI frame. The HE compressed beamforming/CQI report includes an HE Compressed Beamforming Report field.

Figure 21:
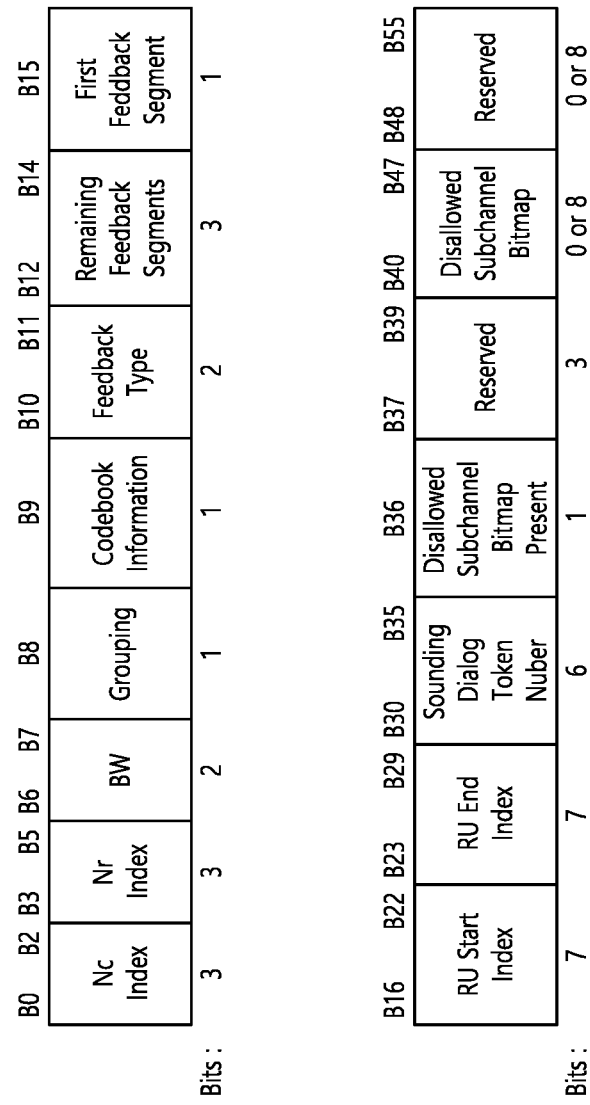
FIG. 21 shows an example of an HE MIMO Control field format.

FIG. 21 shows an example of an HE MIMO Control field format.

A subfield of the HE MIMO Control field is defined as follows.

| Subfield | Description |
|---|---|
| Nc Index | If the Feedback Type subfield indicates SU or MU, the Nc Index sub field indicates the number of columns, Nc, in the compressed beamforming feedback matrix and is set to Nc. <br> If the Feedback Type subfield indicates CQI, the Nc Index subfield indicates the number of space time streams, Nc, in the CQI Report and is set to Nc − 1. |
| Nr Index | If the Feedbuck Type subfield indicates SU or MU, then the Nr index subfield indicates the number of rows, Nr, in the compressed beamforming feedback mairix and is set to Nr − 1. The value 0 is reserved. <br> If the Feedback Type subfield indicates CQI, then the Nr Index subfield is reserved. |
| BW | Indicates the channel width used to determine the starting and ending subcarrier indices when interpreting the RU Start Index and RU End Index subfields. <br> Set to 0 for 20 MHz <br> Set to 1 for 40 MHz <br> Set to 2 for 80 MHz <br> Set to 3 for 160 MHz and 80 + 80 MHz |
| Grouping | If the Feedback Type subfield indie its SU or MU, then the Grouping subfield indicates the subcarrier grouping, Ng, used for the compressed beamforming feedback matrix: <br> Set io 0 for Ng = 4 <br> Set to 1 for Ng = 16 <br> if the Feedback Type subfield indicates CQI, then the Grouping subfield is reserved. |
| Codebook. Information | Indicates ihe size of codebook entries. <br> if the Feedback Type subfield indicates SU: <br> Set to 0 for 4 bits for $\phi$ and 2 bits for $\psi$ <br> Set to 1 for 6 bits for $\phi$ and 4 bits for $\psi$ <br> if ihe Feedback Type subfield indicates MU: <br> Set to 0 for 7 bits for $\phi$ and 5 bits for $\psi$ <br> Set to 1 for 9 bits for $\phi$ and 7 bits for $\psi$ <br> If the Feedback Type subfield indicates CQI, then the Codebook Information subfield is reserved. <br> NOTE-The codebook size for MU Feedback with Ng = 16 is limited to ($\phi$, $\psi$) = {9, 7} |
| Feedback Type | Indicates the feedback type: <br> Set to 0 for SU <br> Set to 1 for MU <br> Set to 2 for CQI <br> 3 is reserved |
| Retaining Feedback Segments | Indicates the number of remainitg feedback segments for the associated HE Compressed Beamforming/CQI frame: <br> Set to 0 for the last feedback segment of a segmented report or the only feedback segment of an unsegmented report. <br> Set to a value between 1 and 7 for a feedback segment that is not the last feedback segment of a segmented report. <br> In a retransmitted feedback segment, the subfield is set to the same value associated with the feedback segment in the original transmission. |
| Pirst Feedback Segment | Set to 1 for the first feedback segment of a segmented report or the only feedback segment of an unsegmented report. <br> Set to 0 if not the first feedback segment or if the HE Compressed Beamforming Report field and HE MU Exclusive Beamforming Report field are not present in the frame. <br> In a retransmitted feedback segment the subfield is set to the same value associated with the feedback segment in the original transmission. <br> NOTE-The First Feedback Segment subfield is always set to 0 if the Feedback Type subfield indicates CQI because the HE Compressed Beamforming/CQI Report frame is always less than I1 454 octets m length. |
| RU Start Index | The starting RU index indicates the first 26-tone RU for which the HE beamformer is requesting feedback. |
| RU End Index | The ending RU index indicates the last 26-tone RU for which the HE beamformer is requesting feedback |
| Sounding Dialog Token Number | Set to the same value as the Sounding Dialog Token Number field in the corresponding HE NDP Announcement frame. |

The terms used will be defined as follows, Nc is a number of columns in a matrix, Nr is a number of rows in a matrix, and Ng is a number of adjacent subcarriers that are grouped in order to be used for a beamforming feedback matrix. Nsd is a number of data according to a tone plan, and the Nsd may be determined in accordance with Ng, which is a grouping factor within a preconfigured band. Na is a number of angles that are used for a compressed beamforming feedback matrix.

The HE compressed Beamforming Report field includes a Compressed Beamforming feedback matrix V that is used by a transmitting beamformer in order to determine an average Signal to Noise Ratio (SNR) of each space-time stream and a steering matrix Q.

A size of the HE Compressed Beamforming Report field is determined based on a value of the HE MIMO Control field. The HE Compressed Beamforming Report field includes HE Compressed Beamforming Report information, which is described as follows.

| Field | Size (bits) | Meaning |
| --- | --- | --- |
| Average SNR of Space-Time Stream 1 | 8 | Signal-to-noise ratio at the benmformee for space-time stream 1 averaged over all data subcarriers. See Table 9-79 (Average SNR of Space-Time Stream i subfield). |
| ... | ... | ... |
| Average SNR of Space-Time Stream Nc | 8 | Signal-to-noise ratio at the beamformee for space-time stream Nc averaged over all data subcarriers. See Table 9-79 (Average SNR of Space-Time Stream i subfield). |
| Compressed beamforming feedback matrix V for subcarrier k = scidx(0) | $Na \times (b_\phi + b_\psi)/2$ | Compressed beamforming feedback matrix defined in Table 9-73 (Order of angles in the Compressed Beamforming Feedback Matrix subfield when used in a non-SIG band) |
| Compressed beamforming feedback matrix V for subcarrier k = scidx(1) | $Na \times (b_\phi + b_\psi)/2$ | Compressed beamforming feedback matrix defined in Table 9-73 (Order of angles in the Compressed Beamforming Feedback Matrix subfield when used in a non-SIG band) |
| Compressed beamforming feedback matrix V for subcarrier k = scidx(2) | $Na \times (b_\phi + b_\psi)/2$ | Compressed beamforming feedback matrix defined in Table 9-73 (Order of angles in the Compressed Beamforming Feedback Matrix subfield when used in a non-SIG band) |
| ... | ... | ... |
| Compressed beamforming feedback matrix V for subcarrier k = scidx(Ns − 1) | $Na \times (b_\phi + b_\psi)/2$ | Compressed beamforming feedback matrix defined in Table 9-73 (Order of angles in the Compressed Beamforming Feedback Matrix subfield when used in a non-SIG band) |

Referring to the table presented above, it may be known that a bit size of a Beamforming feedback matrix V per subcarrier is equal to Na×(bit_phi+bit_psi)/2.

Additionally, in the table, Ns is a number of subcarriers in which a compressed beamforming feedback matrix is re-transmitted. Depending upon which one of a beamformer or beamformee determines a feedback parameter, a method that is referred to as grouping is used for reducing the Ns. And, herein, only one compressed beamforming feedback matrix is reported for each adjacent subcarrier group of Ng. Ns performs the functions of BW, RU Start Index, RU End Index, and Grouping subfields of the HE MIMO Control field.

Subcarrier indexes scidx(0) and scidx(Ns−1) that are identified by an RU Start Index and an RU End Index, respectively, will be defined as shown below together with the BW and Grouping subfields. Firstly, when Ng=4, scidx(0) and scidx(Ns−1) per RU (or RU Start Index and RU End Index) are as shown below.

| RU Index | 20 MHz | | 40 MHz | | 80 MHz | | 160 MHz | | 80 + 80 MHz | |
| --- | --- | --- | --- | --- | --- | --- | --- | --- | --- | --- |
| | S | E | S | E | S | E | S | E | S | E |
| 0 | −122 | −96 | −244 | −216 | −500 | −472 | −1012 | −984 | −500(L) | −474(L) |
| 1 | −96 | −68 | −220 | −192 | −476 | −448 | −988 | −960 | −476(L) | −448(L) |
| 2 | −68 | −40 | −192 | −164 | −448 | −420 | −960 | −932 | −448(L) | −420(L) |
| 3 | −44 | −16 | −164 | −136 | −420 | −392 | −932 | −904 | −420(L) | −392(L) |
| 4 | −16 | 16 | −136 | −108 | −392 | −364 | −904 | −876 | −392(L) | −364(L) |
| 5 | 16 | 44 | −112 | −84 | −368 | −340 | −880 | −852 | −368(L) | −340(L) |
| 6 | 40 | 68 | −84 | −56 | −340 | −312 | −852 | −824 | −340(L) | −312(L) |
| 7 | 68 | 96 | −56 | −28 | −312 | −284 | −824 | −796 | −312(L) | −284(L) |

-continued

| RU Index | 20 MHz S | 20 MHz E | 40 MHz S | 40 MHz E | 80 MHz S | 80 MHz E | 160 MHz S | 160 MHz E | 80 + 80 MHz S | 80 + 80 MHz E |
|---|---|---|---|---|---|---|---|---|---|---|
| 8  | 96 | 122 | −32 | −4   | −288 | −260 | −800 | −772 | −288(L) | −260(L) |
| 9  |    |     | 4   | 32   | −260 | −232 | −772 | −744 | −260(L) | −232(L) |
| 10 |    |     | 28  | 56   | −232 | −204 | −744 | −716 | −232(L) | −204(L) |
| 11 |    |     | 56  | 84   | −204 | −176 | −716 | −688 | −204(L) | −176(L) |
| 12 |    |     | 84  | 112  | −180 | −152 | −692 | −664 | −180(L) | −152(L) |
| 13 |    |     | 108 | 136  | −152 | −124 | −664 | −636 | −152(L) | −124(L) |
| 14 |    |     | 136 | 164  | −124 | −96  | −636 | −608 | −124(L) | −96(L)  |
| 15 |    |     | 164 | 192  | −100 | −72  | −612 | −584 | −100(L) | −72(L)  |
| 16 |    |     | 192 | 220  | −72  | −44  | −584 | −556 | −72(L)  | −44(L)  |
| 17 |    |     | 216 | 244  | −44  | −16  | −556 | −528 | −44(L)  | −16(L)  |
| 18 |    |     |     |      | −16  | 16   | −528 | −496 | −16(L)  | 16(L)   |
| 19 |    |     |     |      | 16   | 44   | −496 | −468 | 16(L)   | 44(L)   |
| 20 |    |     |     |      | 44   | 72   | −468 | −440 | 44(L)   | 72(L)   |
| 21 |    |     |     |      | 72   | 100  | −440 | −412 | 72(L)   | 100(L)  |
| 22 |    |     |     |      | 96   | 124  | −416 | −388 | 96(L)   | 124(L)  |
| 23 |    |     |     |      | 124  | 152  | −388 | −360 | 124(L)  | 152(L)  |
| 24 |    |     |     |      | 152  | 180  | −360 | −332 | 152(L)  | 180(L)  |
| 25 |    |     |     |      | 176  | 204  | −336 | −308 | 176(L)  | 204(L)  |
| 26 |    |     |     |      | 204  | 232  | −308 | −280 | 204(L)  | 232(L)  |
| 27 |    |     |     |      | 232  | 260  | −280 | −252 | 232(L)  | 260(L)  |
| 28 |    |     |     |      | 260  | 288  | −252 | −224 | 260(L)  | 288(L)  |
| 29 |    |     |     |      | 284  | 312  | −228 | −200 | 284(L)  | 312(L)  |
| 30 |    |     |     |      | 312  | 340  | −200 | −172 | 312(L)  | 340(L)  |
| 31 |    |     |     |      | 340  | 368  | −172 | −144 | 340(L)  | 368(L)  |
| 32 |    |     |     |      | 364  | 392  | −148 | −120 | 364(L)  | 392(L)  |
| 33 |    |     |     |      | 392  | 420  | −120 | −92  | 392(L)  | 420(L)  |
| 34 |    |     |     |      | 420  | 448  | −92  | −64  | 420(L)  | 448(L)  |
| 35 |    |     |     |      | 448  | 476  | −64  | −36  | 448(L)  | 476(L)  |
| 36 |    |     |     |      | 472  | 500  | −40  | −12  | 472(L)  | 500(L)  |
| 37 |    |     |     |      |      |      | 12   | 40   | −500(H) | −472(H) |
| 38 |    |     |     |      |      |      | 36   | 64   | −476(H) | −448(H) |
| 39 |    |     |     |      |      |      | 64   | 92   | −448(H) | −420(H) |
| 40 |    |     |     |      |      |      | 92   | 120  | −420(H) | −392(H) |
| 41 |    |     |     |      |      |      | 120  | 148  | −392(H) | −364(H) |
| 42 |    |     |     |      |      |      | 144  | 172  | −368(H) | −340(H) |
| 43 |    |     |     |      |      |      | 172  | 200  | −340(H) | −312(H) |
| 44 |    |     |     |      |      |      | 200  | 228  | −312(H) | −284(H) |
| 45 |    |     |     |      |      |      | 224  | 252  | −288(H) | −260(H) |
| 46 |    |     |     |      |      |      | 252  | 280  | −260(H) | −232(H) |
| 47 |    |     |     |      |      |      | 280  | 308  | −232(H) | −204(H) |
| 48 |    |     |     |      |      |      | 308  | 336  | −204(H) | −176(H) |
| 49 |    |     |     |      |      |      | 332  | 360  | −180(H) | −152(H) |
| 50 |    |     |     |      |      |      | 360  | 388  | −152(H) | −124(H) |
| 51 |    |     |     |      |      |      | 388  | 416  | −124(H) | −96(H)  |
| 52 |    |     |     |      |      |      | 412  | 440  | −100(H) | −72(H)  |
| 53 |    |     |     |      |      |      | 440  | 468  | −72(H)  | −44(H)  |
| 54 |    |     |     |      |      |      | 468  | 496  | −44(H)  | −16(H)  |
| 55 |    |     |     |      |      |      | 496  | 528  | −16(H)  | 16(H)   |
| 56 |    |     |     |      |      |      | 528  | 556  | 16(H)   | 44(H)   |
| 57 |    |     |     |      |      |      | 556  | 584  | 44(H)   | 72(H)   |
| 58 |    |     |     |      |      |      | 584  | 612  | 72(H)   | 100(H)  |
| 59 |    |     |     |      |      |      | 608  | 636  | 96(H)   | 124(H)  |
| 60 |    |     |     |      |      |      | 636  | 664  | 124(H)  | 152(H)  |
| 61 |    |     |     |      |      |      | 664  | 692  | 152(H)  | 180(H)  |
| 62 |    |     |     |      |      |      | 688  | 716  | 176(H)  | 204(H)  |
| 63 |    |     |     |      |      |      | 716  | 744  | 204(H)  | 232(H)  |
| 64 |    |     |     |      |      |      | 744  | 772  | 232(H)  | 260(H)  |
| 65 |    |     |     |      |      |      | 772  | 800  | 260(H)  | 288(H)  |
| 66 |    |     |     |      |      |      | 796  | 824  | 284(H)  | 312(H)  |
| 67 |    |     |     |      |      |      | 824  | 852  | 312(H)  | 340(H)  |
| 68 |    |     |     |      |      |      | 852  | 880  | 340(H)  | 368(H)  |
| 69 |    |     |     |      |      |      | 876  | 904  | 364(H)  | 392(H)  |
| 70 |    |     |     |      |      |      | 904  | 932  | 392(H)  | 420(H)  |
| 71 |    |     |     |      |      |      | 932  | 960  | 420(H)  | 448(H)  |
| 72 |    |     |     |      |      |      | 960  | 988  | 448(H)  | 476(H)  |
| 73 |    |     |     |      |      |      | 984  | 1012 | 472(H)  | 500(H)  |

NOTE 1
S denotes subcarrier index scidx(0), identified by the RU Start Index subfield; E denotes subcarrier index scidx(Ns − 1), identified by the RU End Index subfield.

NOTE 2
x(L) denotes subcarrier index x in the frequency segment lower in frequency, and x(H) denotes subcarrier index x in the frequency segment higher in frequency.

Additionally, when Ng=16, scidx(0) and scidx(Ns−1) per RU (or RU Start Index and RU End Index) are as shown below.

| RU Index | 20 MHz S | 20 MHz E | 40 MHz S | 40 MHz E | 80 MHz S | 80 MHz E | 160 MHz S | 160 MHz E | 80 + 80 MHz S | 80 + 80 MHz E |
|---|---|---|---|---|---|---|---|---|---|---|
| 0 | −122 | −84 | −244 | −212 | −500 | −468 | −1012 | −980 | −500(L) | −468(L) |
| 1 | −100 | −68 | −228 | −180 | −484 | −436 | −996 | −948 | −484(L) | −436(L) |
| 2 | −68 | −36 | −196 | −164 | −452 | −420 | −964 | −932 | −452(L) | −420(L) |
| 3 | −52 | −4 | −164 | −132 | −420 | −388 | −932 | −900 | −420(L) | −388(L) |
| 4 | −20 | 20 | −148 | −100 | −404 | −356 | −916 | −868 | −404(L) | −356(L) |
| 5 | 4 | 52 | −116 | −84 | −372 | −340 | −884 | −852 | −372(L) | −340(L) |
| 6 | 36 | 68 | −84 | −52 | −340 | −308 | −852 | −820 | −340(L) | −308(L) |
| 7 | 68 | 100 | −68 | −20 | −324 | −276 | −836 | −788 | −324(L) | −276(L) |
| 8 | 84 | 122 | −36 | −4 | −292 | −260 | −804 | −772 | −292(L) | −260(L) |
| 9 | | | 4 | 36 | −260 | −228 | −772 | −740 | −260(L) | −228(L) |
| 10 | | | 20 | 68 | −244 | −196 | −756 | −708 | −244(L) | −196(L) |
| 11 | | | 52 | 84 | −212 | −164 | −724 | −676 | −212(L) | −164(L) |
| 12 | | | 84 | 116 | −180 | −148 | −692 | −660 | −180(L) | −148(L) |
| 13 | | | 100 | 148 | −164 | −116 | −676 | −628 | −164(L) | −116(L) |
| 14 | | | 132 | 164 | −132 | −84 | −644 | −596 | −132(L) | −84(L) |
| 15 | | | 164 | 196 | −100 | −68 | −612 | −580 | −100(L) | −68(L) |
| 16 | | | 180 | 228 | −84 | −36 | −596 | −548 | −84(L) | −36(L) |
| 17 | | | 212 | 244 | −52 | −4 | −564 | −516 | −52(L) | −4(L) |
| 18 | | | | | −20 | 20 | −532 | −492 | −20(L) | 20(L) |
| 19 | | | | | 4 | 52 | −508 | −460 | 4(L) | 52(L) |
| 20 | | | | | 36 | 84 | −476 | −428 | 36(L) | 84(L) |
| 21 | | | | | 68 | 100 | −444 | −412 | 68(L) | 100(L) |
| 22 | | | | | 84 | 132 | −428 | −380 | 84(L) | 132(L) |
| 23 | | | | | 116 | 164 | −396 | −348 | 116(L) | 164(L) |
| 24 | | | | | 148 | 180 | −364 | −332 | 148(L) | 180(L) |
| 25 | | | | | 164 | 212 | −348 | −300 | 164(L) | 212(L) |
| 26 | | | | | 196 | 244 | −316 | −268 | 196(L) | 244(L) |
| 27 | | | | | 228 | 260 | −284 | −252 | 228(L) | 260(L) |
| 28 | | | | | 260 | 292 | −252 | −220 | 260(L) | 292(L) |
| 29 | | | | | 276 | 324 | −236 | −188 | 276(L) | 324(L) |
| 30 | | | | | 308 | 340 | −204 | −172 | 308(L) | 340(L) |
| 31 | | | | | 340 | 372 | −172 | −140 | 340(L) | 372(L) |
| 32 | | | | | 356 | 404 | −156 | −108 | 356(L) | 404(L) |
| 33 | | | | | 388 | 420 | −124 | −92 | 388(L) | 420(L) |
| 34 | | | | | 420 | 452 | −92 | −60 | 420(L) | 452(L) |
| 35 | | | | | 436 | 484 | −76 | −28 | 436(L) | 484(L) |
| 36 | | | | | 468 | 500 | −44 | −12 | 468(L) | 500(L) |
| 37 | | | | | | | 12 | 44 | −500(H) | −468(H) |
| 38 | | | | | | | 28 | 76 | −484(H) | −436(H) |
| 39 | | | | | | | 60 | 92 | −452(H) | −420(H) |
| 40 | | | | | | | 92 | 124 | −420(H) | −388(H) |
| 41 | | | | | | | 108 | 156 | −404(H) | −356(H) |
| 42 | | | | | | | 140 | 172 | −372(H) | −340(H) |
| 43 | | | | | | | 172 | 204 | −340(H) | −308(H) |
| 44 | | | | | | | 188 | 236 | −324(H) | −276(H) |
| 45 | | | | | | | 220 | 252 | −292(H) | −260(H) |
| 46 | | | | | | | 252 | 284 | −260(H) | −228(H) |
| 47 | | | | | | | 268 | 316 | −244(H) | −196)H) |
| 48 | | | | | | | 300 | 348 | −212(H) | −464(H) |
| 49 | | | | | | | 332 | 364 | −180(H) | −148(H) |
| 50 | | | | | | | 348 | 396 | −164(H) | −116(H) |
| 51 | | | | | | | 380 | 428 | −132(H) | −84(H) |
| 52 | | | | | | | 412 | 444 | −100(H) | −68(H) |
| 53 | | | | | | | 428 | 476 | −84(H) | −36(H) |
| 54 | | | | | | | 460 | 508 | −52(H) | −4(H) |
| 55 | | | | | | | 492 | 532 | −20(H) | 20(H) |
| 56 | | | | | | | 516 | 564 | 4(H) | 52(H) |
| 57 | | | | | | | 548 | 596 | 36(H) | 84(H) |
| 58 | | | | | | | 580 | 612 | 68(H) | 100(H) |
| 59 | | | | | | | 596 | 644 | 84(H) | 132(H) |
| 60 | | | | | | | 628 | 676 | 116(H) | 164(H) |
| 61 | | | | | | | 660 | 692 | 148(H) | 180(H) |
| 62 | | | | | | | 676 | 724 | 164(H) | 212(H) |
| 63 | | | | | | | 708 | 756 | 196(H) | 244(H) |
| 64 | | | | | | | 740 | 772 | 228(H) | 260(H) |
| 65 | | | | | | | 772 | 804 | 260(H) | 292(H) |
| 66 | | | | | | | 788 | 836 | 276(H) | 324(H) |

-continued

| RU Index | 20 MHz S | 20 MHz E | 40 MHz S | 40 MHz E | 80 MHz S | 80 MHz E | 160 MHz S | 160 MHz E | 80 + 80 MHz S | 80 + 80 MHz E |
|---|---|---|---|---|---|---|---|---|---|---|
| 67 | | | | | | | 820 | 852 | 308(H) | 340(H) |
| 68 | | | | | | | 852 | 884 | 340(H) | 372(H) |
| 69 | | | | | | | 868 | 916 | 356(H) | 404(H) |
| 70 | | | | | | | 900 | 932 | 388(H) | 420(H) |
| 71 | | | | | | | 932 | 964 | 420(H) | 452(H) |
| 72 | | | | | | | 948 | 996 | 436(H) | 484(H) |
| 73 | | | | | | | 980 | 1012 | 468(H) | 500(H) |

NOTE 1
S denotes subcarrier index scidx(0), identified by the RU Start Index subfield, E denotes subcarrier index scidx(Ns − 1) identified by the RU End Index subfield.
NOTE 2
x(L) denotes subcarrier index x in the frequency segment lower in frequency, and x(H) denotes subcarrier index x in the frequency segment higher in frequency.

Additionally, subcarrier indexes scidx(i), i=0, Ns−1 that start from scidx(0) and end with scidx(Ns−1) are defined as shown below. And, these are subsets of the subcarrier indexes that are identified by the BW and Grouping subfields.

| Channel Width | Ng | Superset of subcarrier indices (scidx) |
|---|---|---|
| 20 MHz | 4 | −122, −120, −116, . . . ,−8, −4, −2, 2, 4, 8, . . . , 116, 120, 122 |
| | 16 | −122, −116, −100, . . . , −20, −4, −2, 2, 4, 20, . . . ,100, 116, 122 |
| 40 MHz | 4 | −244, −240, . . . , −8, −4, 4, 8, . . . , 240, 244 |
| | 16 | −244, −228, . . . , 20, −4, 4, 20, . . . , 228, 244 |
| 80 MHz | 4 | −500, −496, . . . , −8, −4, 4, 8, . . . , 496, 500 |
| | 16 | −500, −484, . . . , −20, −4, 4, 20, . . . , 484, 500 |
| 160 MHz | 4 | −1012, −1008, . . . , −520, −516, −508, −504, . . . , −16, −12, 12, 16, . . . , 504, 508, 516, 520, . . . , 1008, 1012 |
| | 16 | −1012, −996, . . . , −532, −516, −508, −492, . . . ,−28, −12, 12, 28, . . . ,492, 508, 516, 532, . . . , 996, 1012 |
| 80 + 80 MHz | 4 | −500(L), −496(L), . . . , −8(L), −4(L), 4(L), 8(L), . . . , 496(L), 500(L), −500(H), −496(H), . . . , −8(H), −4(H), 4(H), 8(H), . . . , 496(H), 500(H) |
| | 16 | −500(L), −484(L), . . . , −20(L), −4(L), 4(L), 20(L), . . . , 484(L), 500(L), −500(H), −484(H), . . . , −20(H), −4(H), 4(H), 20(H), . . . , 484(H), 500(H) |

NOTE 1-
x(L) denotes subcarrier index x in the frequency segment lower in frequency, and x(H) denotes subcarrier index x in the frequency segment higher in frequency.
NOTE 2-
". . . " denotes an arithmetic progression in Ng increments
NOTE 3-
Pilot subcarriers are not skipped.

4. Embodiment(s) Applicable to the Present Specification

In order to increase a peak throughput, the 802.11 system is considering the transmission of increased streams by using a band that is wider than the legacy 11ax, or by using a larger number of antennas. Moreover, the present specification is also considering a method of using various bands by performing aggregation.

In a WLAN system (802.11), in order to transmit a SU/MU MIMO PPDU, channel information for configuring a precoding/beamforming matrix is needed. For this, procedures for sounding and feeding back channel information are needed, and, most particularly, the present specification proposes subcarrier indexes for feeding back channel information in a wide bandwidth. That is, the present specification proposes subcarrier indexes feeding back channel information in order to configure a precoding/beamforming matrix for transmitting a SU/MU MIMO PPDU by suing a wideband.

In the legacy 11ax, in order to transmit a SU/MU MIMO PPDU, a Q matrix may be configured by using channel information. For this, procedures of sounding and receiving feedback on channel information are needed. And, herein, an NDP may be used as the PPDU for sounding. The corresponding procedure is described in detail in the above-described section 3. HE Sounding Protocol. Most particularly, a feedback tone may vary in accordance with the Ng, and a feedback tone for each bandwidth is defined in 11ax. This is also described in detail in the above-described section 3. HE Sounding Protocol.

In 11be, a wide bandwidth (240/160+80/320/160+160 MHz) transmission is being considered, and the corresponding feedback tones need to be defined. A value of 4 or 16 may be used for the Ng, which is the same as the legacy 11ax. And, in 20/40/80/160/80+80 MHz used in the legacy 11ax, the same carrier indexes used in the legacy method may be used without modification as the feedback tones (as defined above, the subcarrier indexes (scidx(i), i=0, . . . Ns−1) that are identified by the BW and Grouping subfields) . In a wide bandwidth, the design of the feedback tone may vary in accordance with the tone plan, and the design is proposed as described below while considering the tone plan in which the legacy 80 MHz tone plan (or a newly proposed 80 MHz tone plan) is repeated and a new tone plan.

The same technical characteristics of 11ax may be used as they are (without modification) for the technical characteristics related to the tone plan that will be described below and an indicator for the corresponding tone plan. For example, the technical characteristics that are described in the present specification may also be identically applied to the RU of the 11be/EHT standard. That is, the technical characteristics that are described in section 3. HE Sounding Protocol may also be identically applied to an RU being included in an STF/LTF/Data field of an EHT PPDU. Furthermore, the technical characteristics (i.e., location of an RU being included in a specific frequency band, size of the RU, pilot signal(s) within the RU, location of a Null subcarrier being positioned in-between the RUs) that are described in section 3. HE Sounding Protocol may also be identically applied to the EHT PPDU that will be described below.

4.1. A Tone Plan Having the Legacy 80 MHz Tone Plan (or a Newly Proposed 80 MHz Tone Plan) Repeated Therein 4.1.A. The Feedback Tone of a Contiguous 240 MHz may be Defined as Follows.

Ng=4

−1524, −1520, −1516, . . . , −1032, −1028, −1020, −1016, . . . , −532, −528, −524, −500, −496, −492, . . . , −8, −4, 4, 8, . . . , 492, 496, 500, 524, 528, 532, . . . , 1016, 1020, 1028, 1032, . . . , 1516, 1520, 1524

Ng=16

−1524, −1508, −1492, . . . , −1044, −1028, −1020, −1004, . . . , −556, −540, −524, −500, −484, −468, . . . , −20, −4, 4, 20, . . . , 468, 484, 500, 524, 540, 556, . . . , 1004, 1020, 1028, 1044, . . . , 1492, 1508, 1524

4.1.B. The Feedback Tone of 160+80 MHz may be Defined as Follows. Herein, + Denotes a Non-Contiguous Situation.

4.1.B.i. The following is a low frequency 160 MHz and high frequency 80 MHz situation. X(L) is subcarrier index X of a low frequency segment. X(H) is a subcarrier index X of a high frequency segment.

Ng=4

160 MHz(L): −1012(L), −1008(L), −1004(L), . . . , −520(L), −516(L), −508(L), −504(L), . . . , −20(L), −16(L), −12(L), 12(L), 16(L), 20(L), . . . , 504(L) 508(L), 516(L), 520(L), . . . , 1004(L), 1008(L), 1012(L),

80 MHz(H): −500(H), −496(H), −492(H), . . . , −8(H), −4(H), 4(H), 8(H), . . . , 492(H), 496(H), 500(H)

Ng=16

160 MHz(L): −1012(L), −996(L), −980(L), . . . , −532(L), −516(L), −508(L), −492(L), . . . , −44(L), −28(L), −12(L), 12(L), 28(L), 44(L), . . . , 492(L) 508(L), 516(L), 532(L), . . . , 980(L), 996(L), 1012(L),

80 MHz(H): −500(H), −484(H), −468(H), . . . , −20(H), −4(H), 4(H), 20(H), . . . , 468(H), 484(H), 500(H)

4.1.B.ii. The Following is a Low Frequency 80 MHz and High Frequency 160 MHz Situation.

Ng=4

80 MHz(L): −500(L), −496(L), −492(L), . . . , −8(L), −4(L), 4(L), 8(L), . . . , 492(L), 496(L), 500(L),

160 MHz(H): −1012(H), −1008(H), −1004(H), . . . , −520(H), −516(H), −508(H), −504(H), . . . , −20(H), −16(H), −12(H), 12(H), 16(H), 20(H), . . . , 504(H) 508(H), 516(H), 520(H), . . . , 1004(H), 1008(H), 1012(H)

Ng=16

80 MHz(L): −500(L), −484(L), −468(L), . . . , −20(L), −4(L), 4(L), 20(L), . . . , 468(L), 484(L), 500(L),

160 MHz(H): −1012(H), −996(H), −980(H), . . . , −532 (H), −516(H), −508(H), −492(H), . . . , −44(H), −28(H), −12(H), 12(H), 28(H), 44(H), . . . , 492(H) 508(H), 516(H), 532(H), . . . , 980(H), 996(H), 1012(H)

4.1.C. The Feedback Tone of a Contiguous 320 MHz may be Defined as Follows.

Ng=4

−2036, −2032, −2028, . . . , −1544, −1540, −1532, −1528, . . . , −1044, −1040, −1036, −1012, −1008, −1004, . . . , −520, −516, −508, −504, . . . , −20, −16, −12, 12, 16, 20, . . . , 504, 508, 516, 520, . . . , 1004, 1008, 1012, 1036, 1040, 1044, . . . , 1528, 1532, 1540, 1544, . . . , 2028, 2032, 2036

Ng=16

−2036, −2020, −2004, . . . , −1556, −1540, −1532, −1516, . . . , −1068, −1052, −1036, −1012, −996, −980, . . . , −532, −516, −508, −492, . . . , −44, −28, −12, 12, 28, 44, . . . , 492, 508, 516, 532, . . . , 980, 996, 1012, 1036, 1052, 1068, . . . , 1516, 1532, 1540, 1556, . . . , 2004, 2020, 2036

4.1.D. The Feedback Tone of 160+160 MHz may be Defined as Follows.

Ng=4

160 MHz(L): −1012(L), −1008(L), −1004(L), . . . , −520(L), −516(L), −508(L), −504(L), . . . , −20(L), −16(L), −12(L), 12(L), 16(L), 20(L), . . . , 504(L), 508(L), 516(L), 520(L), . . . , 1004(L), 1008(L), 1012(L),

160 MHz(H): −1012(H), −1008(H), −1004(H), . . . , −520(H), −516(H), −508(H), −504(H), . . . , −20(H), −16(H), −12(H), 12(H), 16(H), 20(H), . . . , 504(H), 508(H), 516(H), 520(H), . . . , 1004(H), 1008(H), 1012(H)

Ng=16

160 MHz(L): −1012(L), −996(L), −980(L), . . . , −532(L), −516(L), −508(L), −492(L), . . . , −44(L), −28(L), −12(L), 12(L), 28(L), 44(L), . . . , 492(L), 508(L), 516(L), 532(L), . . . , 980(L), 996(L), 1012(L),

160 MHz(H): −1012(H), −996(H), −980(H), . . . , −532 (H), −516(H), −508(H), −492(H), . . . , −44(H), −28(H), −12(H), 12(H), 28(H), 44(H), . . . , 492(H), 508(H), 516(H), 532(H), . . . , 980(H), 996(H), 1012(H)

4.2. A Situation where a New Tone Plan is Being Used 4.2.A. In a Contiguous 160 MHz, a New Tone Plan may be used as Shown Below.

Full band RU:

12/11 guard tone, 5DC, 2020RU or 12/11 guard tone, 7DC, 2018RU

OFDMA tone plan:

12G+996RU+13RU+7DC+13RU+996RU+11G or 12G+996RU+1N+13RU+5DC+13RU+1N+996RU+ 11G

G means guard tone, and N means null tone.

996RU=484RU+1N+26RU+1N+484RU or 996RU=1N+484RU+26RU+484RU+1N

484RU=242RU+242RU

242RU=1N+106RU+1N+26RU+1N+106RU+1N

106RU=52RU+2N+52RU

52RU=26RU+26RU

The feedback tone in this case may be configured to be the same as the legacy feedback tone, or the feedback tone may also be newly configured as follows.

Ng=4

−1012, −1008, −1004, . . . , −8, −4, 4, 8, . . . , 1004, 1008, 1012

Ng=16

−1012, −996, −980, . . . , −20, −4, 4, 20, . . . , 980, 996, 1012

4.2.B. In a Contiguous 240 MHz, a New Tone Plan may be Used as Shown Below.

Full band RU:

12/11 guard tone, 5DC, 3044RU or 12/11 guard tone, 7DC, 3042RU

OFDMA tone plan:

12G+996RU+1N+26RU+1N+996RU (5DC)+1N+26RU+1N+996RU+11G

996RU on both sides (left side 996RU and right side 996RU)=484RU+1N+26RU+1N+996RU (5DC)+1N+26RU+1N+996RU+11G Center 996RU (5DC)=484RU+13RU+7DC+13RU+484RU (the same as the legacy 80 MHz)

484RU=242RU+242RU

242RU=1N+106RU+1N+26RU+1N+106RU+1N

106RU=52RU+2N+52RU

52RU=26RU+26RU

The feedback tone in this case may be configured to be the same as section 4.1, or the feedback tone may also be newly configured as follows.

$N_g=4$

−1524, −1520, −1516, . . . , −8, −4, 4, 8, . . . , 1516, 1520, 1524

$N_g=16$

−1524, −1508, −1492, . . . , −20, −4, 4, 20, . . . , 1492, 1508, 1524

4.2.C. In 160+80 MHz, the tone plan may be configured as a combination of a contiguous 160 MHz new tone plan and the legacy 80 MHz tone plan. The feedback tone in this case may be configured to be the same as section 4.1, or the feedback tone may also be newly configured as follows.

4.2.C.i. The following is a low frequency 160 MHz and high frequency 80 MHz situation.

$N_g=4$

160 MHz(L): −1012(L), −1008(L), −1004(L), . . . , −8(L), −4(L), 4(L), 8(L), . . . , 1004(L), 1008(L), 1012(L),

80 MHz(H): −500(H), −496(H), −492(H), . . . , −8(H), −4(H), 4(H), 8(H), . . . , 492(H), 496(H), 500(H)

$N_g=16$

160 MHz(L): −1012(L), −996(L), −980(L), . . . , −20(L), −4(L), 4(L), 20(L), . . . , 980(L), 996(L), 1012(L),

80 MHz(H): −500(H), −484(H), −468(H), . . . , −20(H), −4(H), 4(H), 20(H), . . . , 468(H), 484(H), 500(H)

4.2.C.ii. The following is a low frequency 80 MHz and high frequency 160 MHz situation.

$N_g=4$

80 MHz(L): −500(L), −496(L), −492(L), . . . , −8(L), −4(L), 4(L), 8(L), . . . , 492(L), 496(L), 500(L),

160 MHz(H): −1012(H), −1008(H), −1004(H), . . . , −8(H), −4(H), 4(H), 8(H), . . . , 1004(H), 1008(H), 1012(H)

$N_g=16$

80 MHz(L): −500(L), −484(L), −468(L), . . . , −20(L), −4(L), 4(L), 20(L), . . . , 468(L), 484(L), 500(L),

160 MHz(H): −1012(H), −996(H), −980(H), . . . , −20(H), −4(H), 4(H), 20(H), . . . , 980(H), 996(H), 1012(H)

4.2.D. In a contiguous 320 MHz, a new tone plan may be used as shown below.

Full Band:

12/11 guard tone, 5DC, 4068RU or 12/11 guard tone, 7DC, 4066RU

OFDMA tone plan:

12G+2020RU+1N+13RU+5DC+13RU+1N+2020RU+11G or 12G+2020RU+13RU+7DC+13RU+2020RU+11G or 12G+2018RU+2N+13RU+7DC+13RU+2N+2018RU+11G

2020RU=996RU+1N+26RU+1N+996RU or 2020RU=1N+996RU+26RU+996RU+1N

2018RU=996RU+26RU+996RU

996RU=484RU+1N+26RU+1N+484RU

996RU=1N+484RU+26RU+484RU+1N

484RU=242RU+242RU

242RU=1N+106RU+1N+26RU+1N+106RU+1N

106RU=52RU+2N+52RU

52RU=26RU+26RU

The feedback tone in this case may be configured to be the same as section 4.1, or the feedback tone may also be newly configured as follows.

$N_g=4$

−2036, −2032, −2028, . . . , −8, −4, 4, 8, . . . , 2028, 2032, 2036

$N_g=16$

−2036, −2020, −2004, . . . , −20, −4, 4, 20, . . . , 2004, 2020, 2036

4.2.E. In 160+160 MHz, the Tone Plan may be Configured as a Combination of Two Contiguous 160 MHz New Tone Plans.

The feedback tone in this case may be configured to be the same as section 4.1, or the feedback tone may also be newly configured as follows.

$N_g=4$

160 MHz(L): −1012(L), −1008(L), −1004(L), . . . , −8(L), −4(L), 4(L), 8(L), . . . , 1004(L), 1008(L), 1012(L),

160 MHz(H): −1012(H), −1008(H), −1004(H), . . . , −8(H), −4(H), 4(H), 8(H), . . . , 1004(H), 1008(H), 1012(H)

$N_g=16$

160 MHz(L): −1012(L), −996(L), −980(L), . . . , −20(L), −4(L), 4(L), 20(L), . . . , 980(L), 996(L), 1012(L),

160 MHz(H): −1012(H), −996(H), −980(H), . . . , −20(H), −4(H), 4(H), 20(H), . . . , 980(H), 996(H), 1012(H)

4.3. A Situation where an OFDMA Tone Plan Considers a Situation where the Legacy 80 MHz Tone Plan is Repeated and where a SU or MU MIMO Tone Plan Using a Full Band Uses a New RU i) In a SU/ER SU PPDU being used in a full bandwidth transmission and in contiguous bandwidth situation in a full bandwidth MU MIMO transmission, a full band RU that is proposed in section 4.2 may be used, and ii) in other situations (OFDMA tone plan), a tone plan having the 80 MHz tone plan is repeated therein that is proposed in section 4.1 may be used.

When considering a dense environment, since most of the transmissions may correspond to MU PPDU transmission having OFDMA applied thereto, for simplicity, a feedback tone may always be configured only of the feedback tone proposed in section 4.1 regardless of the full bandwidth transmission.

Alternatively, since the feedback tone that is newly proposed in section 4.2 covers a larger number of tones, in light of performance, the feedback tone may be configured only of the feedback tone of section 4.2.

Alternatively, the feedback tone may vary in accordance with a feedback type within an EHT MIMO control field (the above-described HE MIMO control field may be used as it is (without modification), or a specific subfield may be inserted or removed). In case of SU, the feedback tone of section 4.2 may be used, and, in case of MU, the feedback tone of section 4.1 may be used. Alternatively, a feedback type of the EHT MIMO control field may be defined as SU/OFDMA MU/full bandwidth MU MIMO/CQI feedback. And, in case of SU or full bandwidth MU MIMO, the feedback tone of section 4.2 may be used, and, in case of OFDMA MU, the feedback tone of section 4.1 may be used.

Information related to the above-described tone plan may be included in an EHT-SIG field. That is, the receiving STA may decode the EHT-SIG field and may obtain information related to an RU that is allocated to the corresponding receiving STA. The information related to a tone plan may be included in an EHT-SIG-A field and may also be included in a random EHT-SIG field (e.g., EHT-SIG-C field) that is newly defined.

In case of a MU transmission, the information related to the above-described tone plan may be included in an EHT-SIG field. That is, the receiving STA may decode the EHT-SIG field and may obtain information related to an RU that is allocated to the corresponding receiving STA. The information related to a tone plan may be included in an EHT-SIG-A field and/or EHT-SIG-B field and may also be included in a random EHT-SIG field (e.g., EHT-SIG-C field) that is newly defined. The EHT-SIG-A may include STA common information just as the HE-SIG-A, and the EHT-SIG-B may include both STA common information and STA specific information just as the HE-SIG-B.

Figure 22:
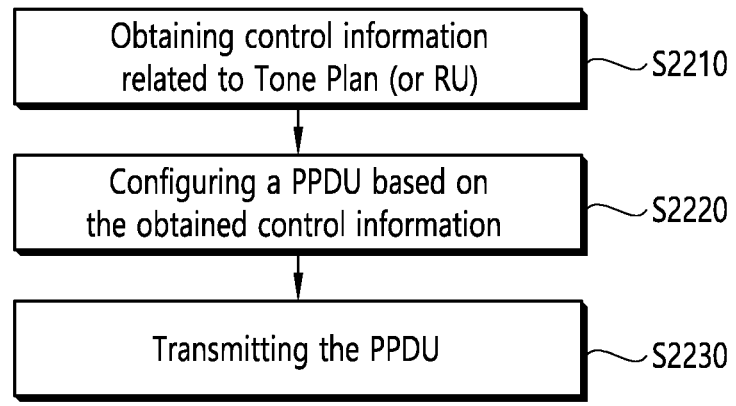
FIG. 22 is a procedure flowchart showing operations of a transmitting device according to the present embodiment.

FIG. 22 is a procedure flowchart showing operations of a transmitting device according to the present embodiment.

An example of FIG. 22 may be performed by a transmitting device (AP and/or non-AP STA). Part of each step (or detailed sub-step that will be described later on) in the example of FIG. 22 may be skipped (or omitted) or varied.

In step S2210, the transmitting device (or transmitting STA) may obtain information related to the above-described tone plan. As described above, the information related to the tone plan includes RU size, position, control information related to the RU, information related to a frequency band including the RU, information on the STA receiving the RU, and so on. Additionally, the transmitting STA may receive a MIMO Control field and may obtain control information for performing a sounding procedure.

In step S2220, the transmitting STA may configure/generate a PPDU based on the obtained control information. The step of configuring/generating a PPDU may include a step of configuring/generating each field of the PPDU. That is, step S2220 includes a step of configuring an EHT-SIG-A/B/C field that includes control information related to a tone plan or sounding. That is, step S2220 may include a step of configuring a field that includes control information (e.g., N bitmap) indicating the size/position of the RU and/or a field that includes an identifier (e.g., AID) of the STA receiving the RU.

Additionally, step S2220 may include a step of generating an STF/LTF sequence that is transmitted through a specific RU. The STF/LTF sequence may be generated based on a preconfigured STA generating sequence/LTF generating sequence.

Additionally, step S2220 may include a step of generating a data field (i.e., MPDU) that is transmitted through a specific RU.

Additionally, in step S2220, the transmitting STA may configure/generate a feedback frame including compressed beamforming or channel quality information (CQI) based on the control information related to sounding.

In step S2230, the transmitting device may transmit the PPDU, which is configured in step S2220, to a receiving device based on step S2230.

While performing step S2230, the transmitting device may perform at least one of the operations of CSD, Spatial Mapping, IDFT/IFFT operation, GI insertion, and so on.

The signal(s)/field(s)/sequences(s) that is/are configured according to the present specification may be transmitted in the format of FIG. 18.

Additionally, as shown in FIG. 1, the transmitting device (or transmitter) may include a memory 112, a processor 111, and a transceiver 113.

The memory 112 may store information on multiple Tone-Plans/RUs that are described in the present specification.

The processor 111 may generate various RUs based on the information stored in the memory 112 and may configure a PPDU. An example of the PPDU that is generated by the processor 111 may be the same as FIG. 1.

The processor 111 may perform all/part of the operations shown in FIG. 22.

The transceiver 113 shown in the drawing include an antenna and may perform analog signal processing. More specifically, the processor 111 may control the transceiver 113 so that the PPDU generated by the processor 111 can be transmitted.

Alternatively, the processor 111 may generate a transmit PPDU and may store information related to the transmit PPDU in the memory 112.

Figure 23:
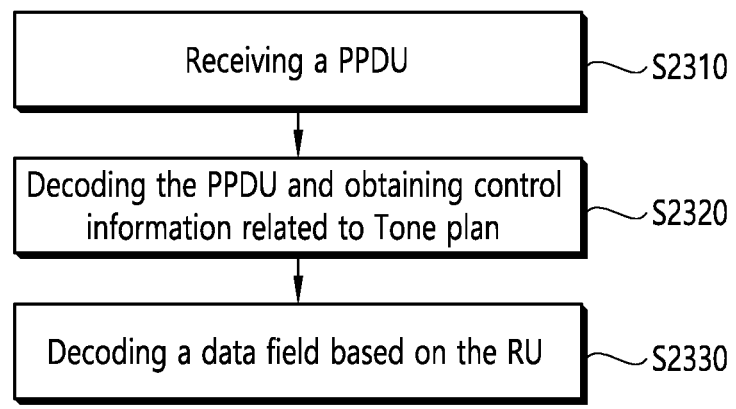
FIG. 23 is a procedure flowchart showing operations of a receiving device according to the present embodiment.

FIG. 23 is a procedure flowchart showing operations of a receiving device according to the present embodiment.

An example of FIG. 23 may be performed by a receiving device (AP and/or non-AP STA).

An example of FIG. 23 may be performed by a receiving STA or receiving device (AP and/or non-AP STA). Part of each step (or detailed sub-step that will be described later on) in the example of FIG. 23 may be skipped (or omitted).

In step S2310, the receiving device (receiving STA) may receive all or part of a PPDU. The received signal may have the format shown in FIG. 18.

A sub-step of step S2310 may be determined based on step S2230. That is, step S2310 may perform operations of recovering (or reconfiguring) the results of the operations of CSD, Spatial Mapping, IDFT/IFFT operation, GI insertion, and so on, which are applied in step S2230.

In step S2320, the receiving device may perform decoding on all/part of the PPDU. Additionally, the receiving device may obtain control information related to a Tone plan (i.e., RU) or sounding from the decoded PPDU.

More specifically, the receiving device decodes an L-SIG and an EHT-SIG of the PPDU based on a Legacy STF/LTF and may obtain information included in the L-SIG and EHT-SIG. Information on various tone plans (i.e., RUs) described in the present specification may be included in the EHT-SIG (EHT-SIG-A/B/C, and so on), and the receiving STA may obtain information related to the tone plan (i.e., RU) through the EHT-SIG. Additionally, the control information related to sounding may be included in a MIMO Control field, and the receiving STA may obtain the control information related to sounding through the MIMO Control field.

In step S2330, the receiving device may decode the remaining part of the PPDU based on the information related to the tone plan (i.e., RU) that is obtained through step S2320. For example, the receiving STA may decode an STF/LTF field of the PPDU based on the information related to the tone plan (i.e., RU). Additionally, the receiving STA may decode a data field of the PPDU based on the information related to the tone plan (i.e., RU) and may obtain an MPDU that is included in the data field.

Additionally, the receiving device may perform a processing operation of delivering (or transferring) data that is decoded in step S2330 to a higher layer (e.g., MAC layer). Furthermore, when signal generation is instructed to the PHY layer from the higher layer in response to the data that is delivered to the higher layer, subsequent operations may be performed.

The above-described PPDU may be received based on the device of FIG. 1.

As shown in FIG. 1, a receiving device may include a memory 122, a processor 121, and a transceiver 123.

The transceiver 123 may receive a PPDU based on the control of the processor 121. For example, the transceiver 123 may include multiple detailed units (not shown). For example, the transceiver 123 may include at least one receiving antenna and may include a filter for the corresponding receiving antenna.

The PPDU that is received through the transceiver 123 may be stored in the memory 122. The processor 121 may process decoding on the received PPDU through the memory 122. The processor 121 may obtain control information related to the tone-plan/RU included in the PPDU and may store the obtained control information in the memory 122.

The processor 121 may perform decoding on the received PPDU. More specifically, the processor 121 may perform operations of recovering (or reconfiguring) the results of the operations of CSD, Spatial Mapping, IDFT/IFFT operation, GI insertion, which are applied to the PPDU. The operations of recovering (or reconfiguring) the results of the operations of CSD, Spatial Mapping, IDFT/IFFT operation, GI insertion may be performed by multiple processing units (not shown) that are individually implemented in the processor 121.

Additionally, the processor 121 may decode a data field of the received PPDU through the transceiver 123.

Also, the processor 121 may process the decoded data. For example, the processor 121 may perform a processing operation of delivering (or transferring) information related to the decoded data field to a higher layer (e.g., MAC layer). Furthermore, when signal generation is instructed to the PHY layer from the higher layer in response to the data that is delivered to the higher layer, subsequent operations may be performed.

Hereinafter, the above-described embodiment will be described with reference to FIG. 1 to FIG. 23.

Figure 24:
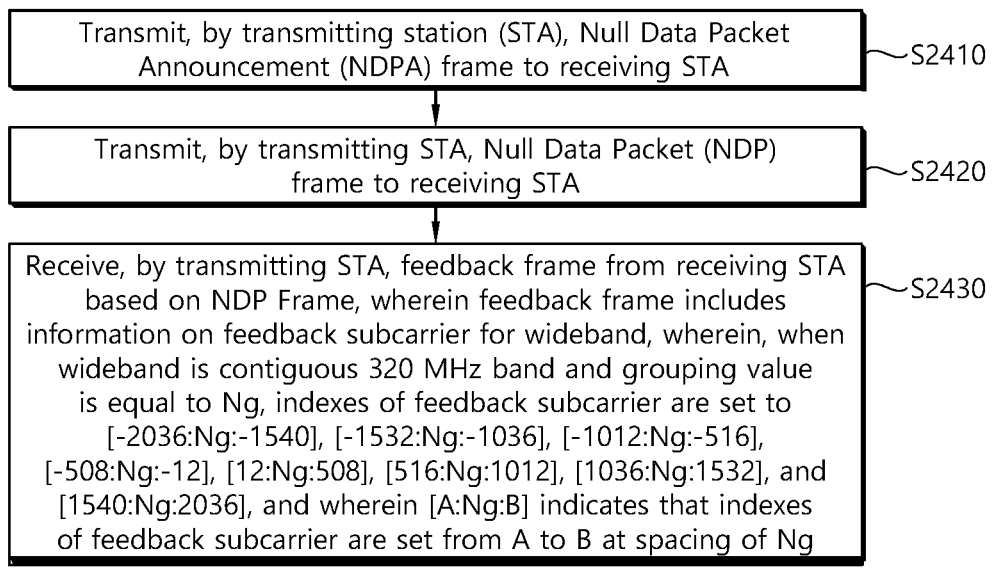
FIG. 24 shows a flowchart showing a procedure of receiving, by a transmitting STA, a feedback frame according to the present embodiment.

FIG. 24 shows a flowchart showing a procedure of receiving, by a transmitting STA, a feedback frame according to the present embodiment.

The example of FIG. 24 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a method for sounding and feeding back channel information in order to transmit a SU/MU MIMO PPDU at a wideband (240 MHz, 320 MHz band) that is supported by an EHT WLAN system. Most particularly, the present embodiment proposes a method for configuring indexes of a feedback subcarrier in channel information for configuring a precoding or beamforming matrix.

The example of FIG. 24 is performed by a transmitting STA, and the transmitting STA may correspond to an access point (AP) or beamformer. A receiving STA of FIG. 24 may correspond to an STA or beamformee that supports an Extremely High Throughput (EHT) WLAN system.

In step S2410, a transmitting station (STA) transmits a Null Data Packet Announcement (NDPA) frame to a receiving STA.

In step S2420, the transmitting STA transmits a Null Data Packet (NDP) frame to the receiving STA. The transmitting STA may perform a sounding procedure with the receiving STA based on the NDP.

In step S2430, the transmitting STA receives a feedback frame from the receiving STA based on the NDP frame. The feedback frame may include channel information according to the sounding procedure (e.g., average SNR per space-time stream or beamforming matrix V per feedback subcarrier). The transmitting STA may generate or configure a steering matrix Q based on the channel information.

The feedback frame includes information on a feedback subcarrier for a wideband. And, the feedback subcarrier may be configured based on a bandwidth and tone plan of the wideband.

For example, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036]. Herein, at this point, [A:Ng:B] indicates that indexes of the feedback subcarrier are set from A to B at a spacing of Ng.

Ng may be set to a value of 4 or 16, which is used in an 802.11ax WLAN system, and the feedback subcarrier may be configured by using the feedback subcarrier for an 80 MHz, 160 MHz or 80+80 MHz band that is defined in the 802.11ax WLAN system as it is (without modification).

The grouping value may be equal to an index spacing between the feedback subcarriers.

The grouping value may be set to a value of 4 or 16 through a grouping subfield of a MIMO Control field. The MIMO Control field may be included in the NDPA frame or the feedback frame. A bandwidth of the wideband may be set to a contiguous 240 MHz, a non-contiguous 160+80 MHz, a contiguous 320 MHz or non-contiguous 160+160 MHz based on a Bandwidth (BW) subfield of the MIMO Control field.

For example, when the grouping value is equal to 4, indexes of the feedback subcarrier may be set to [−2036: 4:−1540], [4532:4:4036], [−1012:4:−516], [−508:4:−12], [12:4:508], [516:4:1012], [1036:4:1532], and [1540:4: 2036]. That is, indexes of the feedback subcarrier may be set to −2036, −2032, −2028, . . . , −1544, −1540, −1532, −1528, . . . , −1044, −1040, −1036, −1012, −1008, −1004, . . . , −520, −516, −508, −504, . . . , −20, −16, −12, 12, 16, 20, . . . , 504, 508, 516, 520, . . . , 1004, 1008, 1012, 1036, 1040, 1044, . . . , 1528, 1532, 1540, 1544, . . . , 2028, 2032, 2036.

Additionally, when the grouping value is equal to 16, indexes of the feedback subcarrier may be set to [−2036: 16:−1540], [4532:16:4036], [−1012:16:−516], [−508:16:−12], [12:16:508], [516:16:1012], [1036:16:1532], and [1540:16:2036]. That is, indexes of the feedback subcarrier may be set to −2036, −2020, −2004, . . . , −1556, −1540, −1532, −1516, . . . , −1068, −1052, −1036, −1012, −996, −980, . . . , −532, −516, −508, −492, . . . , −44, −28, −12, 12, 28, 44, . . . , 492, 508, 516, 532, . . . , 980, 996, 1012, 1036, 1052, 1068, . . . , 1516, 1532, 1540, 1556, . . . , 2004, 2020, 2036.

As another example, when the wideband is configured of a non-contiguous first 160 MHz band and second 160 MHz band, and when the grouping value is equal to Ng, indexes of a feedback subcarrier for the first 160 MHz band may be set to [−1012:Ng:−516], [−508:Ng:−12], [12:Ng:508], and [516:Ng:1012], and indexes of a feedback subcarrier for the second 160 MHz band may be set to [−1012:Ng:−516], [−508:Ng:−12], [12:Ng:508], and [516:Ng:1012]. One of the first and second 160 MHz bands may be a 160 MHz band of a low frequency, and the other may be a 160 MHz band of a high frequency.

It will be assumed that the first 160 MHz band is a 160 MHz band of the low frequency and that the second 160 MHz band is a 160 MHz band of the high frequency.

At this point, when the grouping value is equal to 4, indexes of the feedback subcarrier for the first and second 160 MHz bands may be set to [−1012:4:−516], [−508:4:−12], [12:4:508], and [516:4:1012]. That is, indexes of the feedback subcarrier for the first and second 160 MHz bands may be set to −1012, −1008, −1004, . . . , −520, −516, −508, −504, . . . , −20, −16, −12, 12, 16, 20, . . . , 504, 508, 516, 520, . . . , 1004, 1008, 1012.

When the grouping value is equal to 16, indexes of the feedback subcarrier for the first and second 160 MHz bands may be set to [−1012:16:−516], [−508:16:−12], [12:16:508], and [516:16:1012]. That is, indexes of the feedback subcarrier for the first and second 160 MHz bands may be set to −1012, −996, −980, . . . , −532, −516, −508, −492, . . . , −44, −28, −12, 12, 28, 44, . . . , 492, 508, 516, 532, . . . , 980, 996, 1012.

The transmitting STA may transmit information on a tone plan to the receiving STA.

The information on the tone plan may include allocation information on that a tone plan for the wideband is configured by repeating a tone plan for an 80 MHz band. The tone plan for the 80 MHz band may be set as one of a first tone plan or a second tone plan. The first tone plan may be a tone plan for an 80 MHz band being defined in an 802.11ax WLAN system. The second tone plan may be a tone plan that is configured by repeating 2 times a tone plan for a 40 MHz band being defined in an 802.11ax WLAN system. Additionally, the information on the tone plan may also include allocation information on that the wideband is configured of a new tone plan. The new tone plan has been described above in detail. That is, in a wideband, the design of a feedback subcarrier may vary in accordance with the tone plan, and a feedback subcarrier may be defined for each of the above-described tone plan. Herein, a tone and a subcarrier may be interchangeably used.

Furthermore, the NDP frame may include a Legacy-Signal (L-SIG) field, a Repeated Legacy-Signal (RL-SIG) field, a Universal-Signal (U-SIG) field, an EHT-SIG field, an EHT-Short Training Field (STF), and an EHT-Long Training Field (LTF). The EHT-SIG field may include an EHT-SIG-A field and an EHT-SIG-B field. The EHT-SIG field may further include an EHT-SIG-C field.

Figure 25:
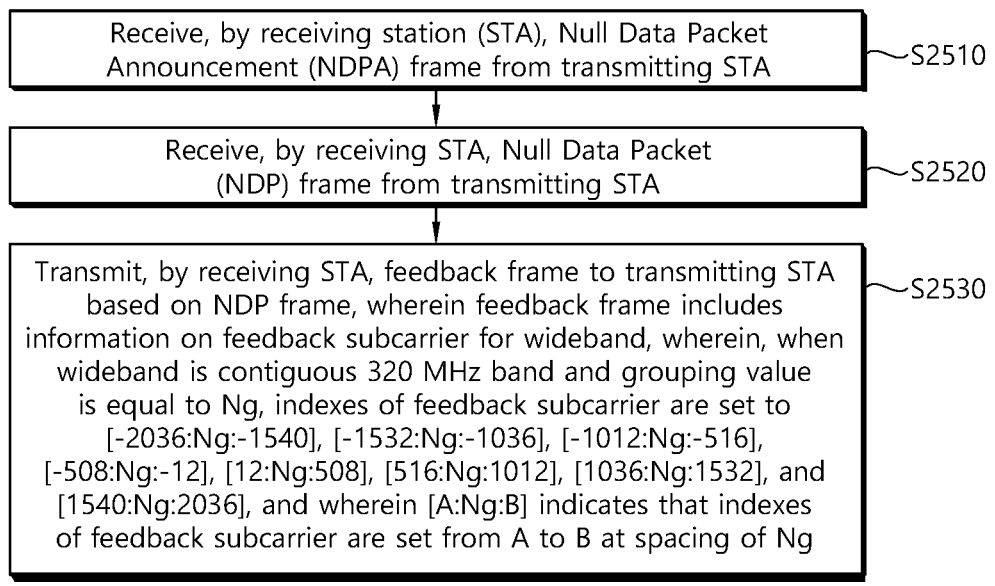
FIG. 25 shows a flowchart showing a procedure of transmitting, by a receiving STA, a feedback frame in a wideband according to the present embodiment.

FIG. 25 shows a flowchart showing a procedure of transmitting, by a receiving STA, a feedback frame in a wideband according to the present embodiment.

The example of FIG. 25 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a method for sounding and feeding back channel information in order to transmit a SU/MU MIMO PPDU at a wideband (240 MHz, 320 MHz band) that is supported by an EHT WLAN system. Most particularly, the present embodiment proposes a method for configuring indexes of a feedback subcarrier in channel information for configuring a precoding or beamforming matrix.

The example of FIG. 25 may be performed by a receiving station (STA), and the receiving STA may correspond to an STA or beamformee that supports an Extremely High Throughput (EHT) WLAN system. A transmitting STA of FIG. 25 may correspond to an access point (AP) or beamformer.

In step S2510, a receiving STA receives a Null Data Packet Announcement (NDPA) frame from a transmitting STA.

In step S2520, the receiving STA receives a Null Data Packet (NDP) frame from the transmitting STA. And, the receiving STA may perform a sounding procedure with the transmitting STA based on the NDP.

In step S2530, the receiving STA transmits a feedback frame to the transmitting STA based on the NDP frame. The feedback frame may include channel information according to the sounding procedure (e.g., average SNR per space-time stream or beamforming matrix V per feedback subcarrier). The transmitting STA may generate or configure a steering matrix Q based on the channel information.

The feedback frame includes information on a feedback subcarrier for a wideband. And, the feedback subcarrier may be configured based on a bandwidth and tone plan of the wideband.

For example, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036]. Herein, at this point, [A:Ng:B] indicates that indexes of the feedback subcarrier are set from A to B at a spacing of Ng.

Ng may be set to a value of 4 or 16, which is used in an 802.11ax WLAN system, and the feedback subcarrier may be configured by using the feedback subcarrier for an 80 MHz, 160 MHz or 80+80 MHz band that is defined in the 802.11ax WLAN system as it is (without modification).

The grouping value may be equal to an index spacing between the feedback subcarriers. The grouping value may be set to a value of 4 or 16 through a grouping subfield of a MIMO Control field. The MIMO Control field may be included in the NDPA frame or the feedback frame. A bandwidth of the wideband may be set to a contiguous 240 MHz, a non-contiguous 160+80 MHz, a contiguous 320 MHz or non-contiguous 160+160 MHz based on a Bandwidth (BW) subfield of the MIMO Control field.

For example, when the grouping value is equal to 4, indexes of the feedback subcarrier may be set to [−2036: 4:−1540], [4532:4:4036], [−1012:4:−516], [−508:4:−12], [12:4:508], [516:4:1012], [1036:4:1532], and [1540:4: 2036]. That is, indexes of the feedback subcarrier may be set to −2036, −2032, −2028, . . . , −1544, −1540, −1532, −1528, . . . , −1044, −1040, −1036, −1012, −1008, −1004, . . . , −520, −516, −508, −504, . . . , −20, −16, −12, 12, 16, 20, . . . , 504, 508, 516, 520, . . . , 1004, 1008, 1012, 1036, 1040, 1044, . . . , 1528, 1532, 1540, 1544, . . . , 2028, 2032, 2036.

Additionally, when the grouping value is equal to 16, indexes of the feedback subcarrier may be set to [−2036: 16:−1540], [4532:16:4036], [−1012:16:−516], [−508:16:−12], [12:16:508], [516:16:1012], [1036:16:1532], and [1540:16:2036]. That is, indexes of the feedback subcarrier may be set to −2036, −2020, −2004, . . . , −1556, −1540, −1532, −1516, . . . , −1068, −1052, −1036, −1012, −996, −980, . . . , −532, −516, −508, −492, . . . , −44, −28, −12, 12, 28, 44, . . . , 492, 508, 516, 532, . . . , 980, 996, 1012, 1036, 1052, 1068, . . . , 1516, 1532, 1540, 1556, . . . , 2004, 2020, 2036.

As another example, when the wideband is configured of a non-contiguous first 160 MHz band and second 160 MHz band, and when the grouping value is equal to Ng, indexes of a feedback subcarrier for the first 160 MHz band may be set to [−1012:Ng:−516], [−508:Ng:−12], [12:Ng:508], and [516:Ng:1012], and indexes of a feedback subcarrier for the second 160 MHz band may be set to [−1012:Ng:−516], [−508:Ng:−12], [12:Ng:508], and [516:Ng:1012]. One of the first and second 160 MHz bands may be a 160 MHz band of a low frequency, and the other may be a 160 MHz band of a high frequency.

It will be assumed that the first 160 MHz band is a 160 MHz band of the low frequency and that the second 160 MHz band is a 160 MHz band of the high frequency.

At this point, when the grouping value is equal to 4, indexes of the feedback subcarrier for the first and second 160 MHz bands may be set to [−1012:4:−516], [−508:4:−12], [12:4:508], and [516:4:1012]. That is, indexes of the feedback subcarrier for the first and second 160 MHz bands may be set to −1012, −1008, −1004, . . . , −520, −516, −508, −504, . . . , −20, −16, −12, 12, 16, 20, . . . , 504, 508, 516, 520, . . . , 1004, 1008, 1012.

When the grouping value is equal to 16, indexes of the feedback subcarrier for the first and second 160 MHz bands may be set to [−1012:16:−516], [−508:16:−12], [12:16:508], and [516:16:1012]. That is, indexes of the feedback subcarrier for the first and second 160 MHz bands may be set to −1012, −996, −980, . . . , −532, −516, −508, −492, . . . , −44, −28, −12, 12, 28, 44, . . . , 492, 508, 516, 532, . . . , 980, 996, 1012.

The transmitting STA may transmit information on a tone plan to the receiving STA.

The information on the tone plan may include allocation information on that a tone plan for the wideband is configured by repeating a tone plan for an 80 MHz band. The tone plan for the 80 MHz band may be set as one of a first tone plan or a second tone plan. The first tone plan may be a tone plan for an 80 MHz band being defined in an 802.11ax WLAN system. The second tone plan may be a tone plan that is configured by repeating 2 times a tone plan for a 40 MHz band being defined in an 802.11ax WLAN system. Additionally, the information on the tone plan may also include allocation information on that the wideband is configured of a new tone plan. The new tone plan has been described above in detail. That is, in a wideband, the design of a feedback subcarrier may vary in accordance with the tone plan, and a feedback subcarrier may be defined for each of the above-described tone plan. Herein, a tone and a subcarrier may be interchangeably used.

Furthermore, the NDP frame may include a Legacy-Signal (L-SIG) field, a Repeated Legacy-Signal (RL-SIG) field, a Universal-Signal (U-SIG) field, an EHT-SIG field, an EHT-Short Training Field (STF), and an EHT-Long Training Field (LTF). The EHT-SIG field may include an EHT-SIG-A field and an EHT-SIG-B field. The EHT-SIG field may further include an EHT-SIG-C field.

4. Device Configuration

Figure 26:
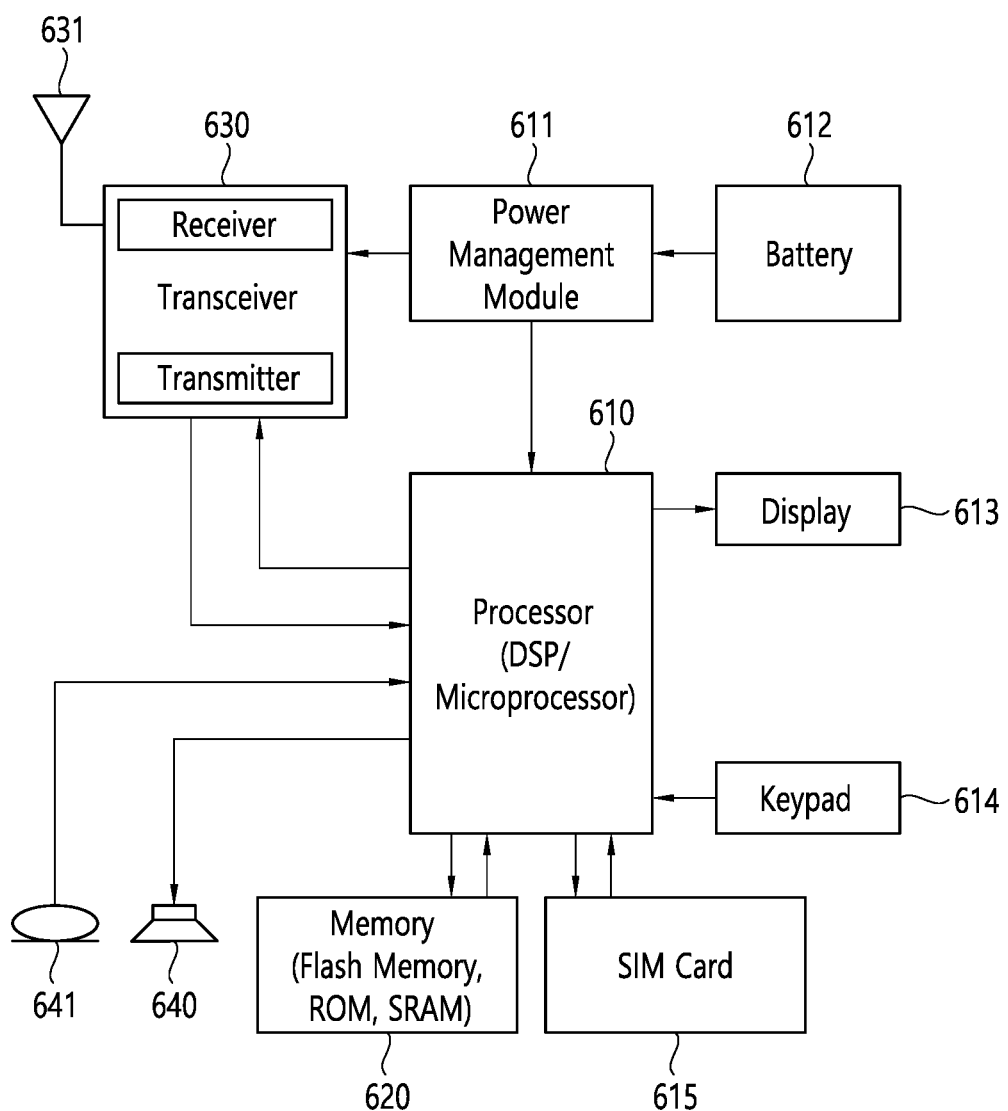
FIG. 26 illustrates an example of a modified transmitting device and/or receiving device of the present specification.

FIG. 26 illustrates an example of a modified transmitting device and/or receiving device of the present specification.

Each device/STA shown in sub-figures (a)/(b) of FIG. 1 may be modified as shown in FIG. 26. A transceiver 630 of FIG. 26 may be the same as the transceiver(s) 113 and 123 of FIG. 1. The transceiver 630 of FIG. 26 may include a receiver and a transmitter.

A processor 610 of FIG. 26 may be the same as the processor(s) 111 and 121 shown in FIG. 1. Alternatively, the processor 610 of FIG. 26 may be the same as the processing chip(s) 114 and 124 shown in FIG. 1.

A memory 150 of FIG. 26 may be the same as the memory(s) 112 and 122 shown in FIG. 1. Alternatively, the memory 150 of FIG. 26 may be a separate external memory that is different from the memory(s) 112 and 122 shown in FIG. 1.

Referring to FIG. 26, the power management module 611 manages power for the processor 610 and/or the transceiver 630. The battery 612 supplies power to the power management module 611. The display 613 outputs results processed by the processor 610. The keypad 614 receives inputs that are to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices, such as mobile phones and computers.

Referring to FIG. 26, the speaker 640 may output sound-related results processed by the processor 610. The microphone 641 may receive sound-related inputs to be used by the processor 610.

The above-described technical features of the present specification may be applied to various devices and methods. For example, the above-described technical features of the present specification may be performed/supported through the device(s) of FIG. 1 and/or FIG. 26. For example, the above-described technical features of the present specification may be applied to only part of FIG. 1 and/or FIG. 26. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 26. For example, the device according to the present specification is a device that configures a feedback subcarrier including channel information for transmitting a SU/MU MIMO PPDU in a wideband. And, the device may include a memory, and a processor being operatively connected to the memory, wherein the processor may be configured to receive a Null Data Packet Announcement (NDPA) frame from a transmitting STA, to receive a Null Data Packet (NDP) frame from the transmitting STA, and to transmit a feedback frame to the transmitting STA based on the NDP frame.

The processor may perform a sounding procedure with the transmitting STA based on the NDP. The feedback frame may include channel information according to the sounding procedure (e.g., average SNR per space-time stream or beamforming matrix V per feedback subcarrier). The transmitting STA may generate or configure a steering matrix Q based on the channel information.

The feedback frame includes information on a feedback subcarrier for a wideband. And, the feedback subcarrier may be configured based on a bandwidth and tone plan of the wideband.

For example, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036]. Herein, at this point, [A:Ng:B] indicates that indexes of the feedback subcarrier are set from A to B at a spacing of Ng.

Ng may be set to a value of 4 or 16, which is used in an 802.11ax WLAN system, and the feedback subcarrier may be configured by using the feedback subcarrier for an 80

MHz, 160 MHz or 80+80 MHz band that is defined in the 802.11ax WLAN system as it is (without modification).

The grouping value may be equal to an index spacing between the feedback subcarriers. The grouping value may be set to a value of 4 or 16 through a grouping subfield of a MIMO Control field. The MIMO Control field may be included in the NDPA frame or the feedback frame. A bandwidth of the wideband may be set to a contiguous 240 MHz, a non-contiguous 160+80 MHz, a contiguous 320 MHz or non-contiguous 160+160 MHz based on a Bandwidth (BW) subfield of the MIMO Control field.

For example, when the grouping value is equal to 4, indexes of the feedback subcarrier may be set to [−2036: 4:−1540], [4532:4:4036], [−1012:4:−516], [−508:4:−12], [12:4:508], [516:4:1012], [1036:4:1532], and [1540:4: 2036]. That is, indexes of the feedback subcarrier may be set to −2036, −2032, −2028, . . . , −1544, −1540, −1532, −1528, . . . , −1044, −1040, −1036, −1012, −1008, −1004, . . . , −520, −516, −508, −504, . . . , −20, −16, −12, 12, 16, 20, . . . , 504, 508, 516, 520, . . . , 1004, 1008, 1012, 1036, 1040, 1044, . . . , 1528, 1532, 1540, 1544, . . . , 2028, 2032, 2036.

Additionally, when the grouping value is equal to 16, indexes of the feedback subcarrier may be set to [−2036: 16:−1540], [4532:16:4036], [−1012:16:−516], [−508:16:− 12], [12:16:508], [516:16:1012], [1036:16:1532], and [1540:16:2036]. That is, indexes of the feedback subcarrier may be set to −2036, −2020, −2004, . . . , −1556, −1540, −1532, −1516, . . . , −1068, −1052, −1036, −1012, −996, −980, . . . , −532, −516, −508, −492, . . . , −44, −28, −12, 12, 28, 44, . . . , 492, 508, 516, 532, . . . , 980, 996, 1012, 1036, 1052, 1068, . . . , 1516, 1532, 1540, 1556, . . . , 2004, 2020, 2036.

As another example, when the wideband is configured of a non-contiguous first 160 MHz band and second 160 MHz band, and when the grouping value is equal to Ng, indexes of a feedback subcarrier for the first 160 MHz band may be set to [−1012:Ng:−516], [−508:Ng:−12], [12:Ng:508], and [516:Ng:1012], and indexes of a feedback subcarrier for the second 160 MHz band may be set to [−1012:Ng:−516], [−508:Ng:−12], [12:Ng:508], and [516:Ng:1012]. One of the first and second 160 MHz bands may be a 160 MHz band of a low frequency, and the other may be a 160 MHz band of a high frequency.

It will be assumed that the first 160 MHz band is a 160 MHz band of the low frequency and that the second 160 MHz band is a 160 MHz band of the high frequency.

At this point, when the grouping value is equal to 4, indexes of the feedback subcarrier for the first and second 160 MHz bands may be set to [−1012:4:−516], [−508:4:− 12], [12:4:508], and [516:4:1012]. That is, indexes of the feedback subcarrier for the first and second 160 MHz bands may be set to −1012, −1008, −1004, . . . , −520, −516, −508, −504, . . . , −20, −16, −12, 12, 16, 20, . . . , 504, 508, 516, 520, . . . , 1004, 1008, 1012.

When the grouping value is equal to 16, indexes of the feedback subcarrier for the first and second 160 MHz bands may be set to [−1012:16:−516], [−508:16:−12], [12:16:508], and [516:16:1012]. That is, indexes of the feedback subcarrier for the first and second 160 MHz bands may be set to −1012, −996, −980, . . . , −532, −516, −508, −492, . . . , −44, −28, −12, 12, 28, 44, . . . , 492, 508, 516, 532, . . . , 980, 996, 1012.

The transmitting STA may transmit information on a tone plan to the receiving STA.

The information on the tone plan may include allocation information on that a tone plan for the wideband is configured by repeating a tone plan for an 80 MHz band. The tone plan for the 80 MHz band may be set as one of a first tone plan or a second tone plan. The first tone plan may be a tone plan for an 80 MHz band being defined in an 802.11ax WLAN system. The second tone plan may be a tone plan that is configured by repeating 2 times a tone plan for a 40 MHz band being defined in an 802.11ax WLAN system. Additionally, the information on the tone plan may also include allocation information on that the wideband is configured of a new tone plan. The new tone plan has been described above in detail. That is, in a wideband, the design of a feedback subcarrier may vary in accordance with the tone plan, and a feedback subcarrier may be defined for each of the above-described tone plan. Herein, a tone and a subcarrier may be interchangeably used.

Furthermore, the NDP frame may include a Legacy-Signal (L-SIG) field, a Repeated Legacy-Signal (RL-SIG) field, a Universal-Signal (U-SIG) field, an EHT-SIG field, an EHT-Short Training Field (STF), and an EHT-Long Training Field (LTF). The EHT-SIG field may include an EHT-SIG-A field and an EHT-SIG-B field. The EHT-SIG field may further include an EHT-SIG-C field.

The technical features of the present specification may be implemented based on a computer readable medium (CRM). For example, the CRM that is proposed in the present specification is a computer readable medium including an instruction being executed by at least one processor.

The CRM may store instructions performing operations including the steps of receiving a Null Data Packet Announcement (NDPA) frame from a transmitting STA, receiving a Null Data Packet (NDP) frame from the transmitting STA, and transmitting a feedback frame to the transmitting STA based on the NDP frame. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 26. Meanwhile, the CRM of the present specification may be the memory(s) 112 and 122 of FIG. 1, or the memory 620 of FIG. 26, or a separate external memory/storage medium/disc, and so on.

The CRM may store an instruction performing an operation including the step of performing a sounding procedure with the transmitting STA based on the NDP. The feedback frame may include channel information according to the sounding procedure (e.g., average SNR per space-time stream or beamforming matrix V per feedback subcarrier). The transmitting STA may generate or configure a steering matrix Q based on the channel information.

The feedback frame includes information on a feedback subcarrier for a wideband. And, the feedback subcarrier may be configured based on a bandwidth and tone plan of the wideband.

For example, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12: Ng:508], [516:Ng:1012], [1036:Ng:1532], and [1540:Ng: 2036]. Herein, at this point, [A:Ng:B] indicates that indexes of the feedback subcarrier are set from A to B at a spacing of Ng.

Ng may be set to a value of 4 or 16, which is used in an 802.11ax WLAN system, and the feedback subcarrier may be configured by using the feedback subcarrier for an 80 MHz, 160 MHz or 80+80 MHz band that is defined in the 802.11ax WLAN system as it is (without modification).

The grouping value may be equal to an index spacing between the feedback subcarriers. The grouping value may be set to a value of 4 or 16 through a grouping subfield of a MIMO Control field. The MIMO Control field may be included in the NDPA frame or the feedback frame. A bandwidth of the wideband may be set to a contiguous 240 MHz, a non-contiguous 160+80 MHz, a contiguous 320 MHz or non-contiguous 160+160 MHz based on a Bandwidth (BW) subfield of the MIMO Control field.

For example, when the grouping value is equal to 4, indexes of the feedback subcarrier may be set to [−2036: 4:−1540], [4532:4:4036], [−1012:4:−516], [−508:4:−12], [12:4:508], [516:4:1012], [1036:4:1532], and [1540:4: 2036]. That is, indexes of the feedback subcarrier may be set to −2036, −2032, −2028, . . . , −1544, −1540, −1532, −1528, . . . , −1044, −1040, −1036, −1012, −1008, −1004, . . . , −520, −516, −508, −504, . . . , −20, −16, −12, 12, 16, 20, . . . , 504, 508, 516, 520, . . . , 1004, 1008, 1012, 1036, 1040, 1044, . . . , 1528, 1532, 1540, 1544, . . . , 2028, 2032, 2036.

Additionally, when the grouping value is equal to 16, indexes of the feedback subcarrier may be set to [−2036: 16:−1540], [4532:16:4036], [−1012:16:−516], [−508:16:− 12], [12:16:508], [516:16:1012], [1036:16:1532], and [1540:16:2036]. That is, indexes of the feedback subcarrier may be set to −2036, −2020, −2004, . . . , −1556, −1540, −1532, −1516, . . . , −1068, −1052, −1036, −1012, −996, −980, . . . , −532, −516, −508, −492, . . . , −44, −28, −12, 12, 28, 44, . . . , 492, 508, 516, 532, . . . , 980, 996, 1012, 1036, 1052, 1068, . . . , 1516, 1532, 1540, 1556, . . . , 2004, 2020, 2036.

As another example, when the wideband is configured of a non-contiguous first 160 MHz band and second 160 MHz band, and when the grouping value is equal to Ng, indexes of a feedback subcarrier for the first 160 MHz band may be set to [−1012:Ng:−516], [−508:Ng:−12], [12:Ng:508], and [516:Ng:1012], and indexes of a feedback subcarrier for the second 160 MHz band may be set to [−1012:Ng:−516], [−508:Ng:−12], [12:Ng:508], and [516:Ng:1012]. One of the first and second 160 MHz bands may be a 160 MHz band of a low frequency, and the other may be a 160 MHz band of a high frequency.

It will be assumed that the first 160 MHz band is a 160 MHz band of the low frequency and that the second 160 MHz band is a 160 MHz band of the high frequency.

At this point, when the grouping value is equal to 4, indexes of the feedback subcarrier for the first and second 160 MHz bands may be set to [−1012:4:−516], [−508:4:− 12], [12:4:508], and [516:4:1012]. That is, indexes of the feedback subcarrier for the first and second 160 MHz bands may be set to −1012, −1008, −1004, . . . , −520, −516, −508, −504, . . . , −20, −16, −12, 12, 16, 20, . . . , 504, 508, 516, 520, . . . , 1004, 1008, 1012.

When the grouping value is equal to 16, indexes of the feedback subcarrier for the first and second 160 MHz bands may be set to [−1012:16:−516], [−508:16:−12], [12:16:508], and [516:16:1012]. That is, indexes of the feedback subcarrier for the first and second 160 MHz bands may be set to −1012, −996, −980, . . . , −532, −516, −508, −492, . . . , −44, −28, −12, 12, 28, 44, . . . , 492, 508, 516, 532, . . . , 980, 996, 1012.

The transmitting STA may transmit information on a tone plan to the receiving STA.

The information on the tone plan may include allocation information on that a tone plan for the wideband is configured by repeating a tone plan for an 80 MHz band. The tone plan for the 80 MHz band may be set as one of a first tone plan or a second tone plan. The first tone plan may be a tone plan for an 80 MHz band being defined in an 802.11ax WLAN system. The second tone plan may be a tone plan that is configured by repeating 2 times a tone plan for a 40 MHz band being defined in an 802.11ax WLAN system. Additionally, the information on the tone plan may also include allocation information on that the wideband is configured of a new tone plan. The new tone plan has been described above in detail. That is, in a wideband, the design of a feedback subcarrier may vary in accordance with the tone plan, and a feedback subcarrier may be defined for each of the above-described tone plan. Herein, a tone and a subcarrier may be interchangeably used.

Furthermore, the NDP frame may include a Legacy-Signal (L-SIG) field, a Repeated Legacy-Signal (RL-SIG) field, a Universal-Signal (U-SIG) field, an EHT-SIG field, an EHT-Short Training Field (STF), and an EHT-Long Training Field (LTF). The EHT-SIG field may include an EHT-SIG-A field and an EHT-SIG-B field. The EHT-SIG field may further include an EHT-SIG-C field.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    receiving, by a receiving station (STA), a Null Data Packet Announcement (NDPA) frame from a transmitting STA;
    receiving, by the receiving STA, a Null Data Packet (NDP) frame from the transmitting STA; and
    transmitting, by the receiving STA, a feedback frame to the transmitting STA based on the NDP frame,
    wherein the feedback frame includes information on a feedback subcarrier for a wideband,
    wherein, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036], and
    wherein [A:Ng:B] indicates that indexes of the feedback subcarrier are set from A to B at a spacing of Ng.

2. The method of claim 1, wherein the grouping value is equal to an index spacing between the feedback subcarriers.

3. The method of claim 1, wherein, when the grouping value is equal to 4, indexes of the feedback subcarrier are set to [−2036:4:−1540], [4532:4:4036], [−1012:4:−516], [−508:4:−12], [12:4:508], [516:4:1012], [1036:4:1532], and [1540:4:2036], and wherein, when the grouping value is equal to 16, indexes of the feedback subcarrier are set to [−2036:16:−1540], [4532:16:4036], [−1012:16:−516], [−508:16:−12], [12:16:508], [516:16:1012], [1036:16:1532], and [1540:16:2036].

4. The method of claim 1, wherein, when the wideband is configured of a non-contiguous first 160 MHz band and second 160 MHz band, and when the grouping value is equal to Ng, indexes of a feedback subcarrier for the first 160 MHz band are set to [−1012:Ng:−516], [−508:Ng:−12], [12:Ng:508], and [516:Ng:1012], and indexes of a feedback subcarrier for the second 160 MHz band are set to [−1012:Ng:−516], [−508:Ng:−12], [12:Ng:508], and [516:Ng:1012].

5. The method of claim 4, wherein, when the grouping value is equal to 4, indexes of the feedback subcarrier for the first and second 160 MHz bands are set to [−1012:4:−516], [−508:4:−12], [12:4:508], and [516:4:1012], and
    wherein, when the grouping value is equal to 16, indexes of the feedback subcarrier for the first and second 160 MHz bands are set to [−1012:16:−516], [−508:16:−12], [12:16:508], and [516:16:1012].

6. The method of claim 1, further comprising:
    receiving, by the receiving STA, information on a tone plan from the transmitting STA,
    wherein the information on the tone plan includes allocation information on that a tone plan for the wideband is configured by repeating a tone plan for an 80 MHz band,
    wherein the tone plan for the 80 MHz band is set as one of a first tone plan or a second tone plan,
    wherein the first tone plan is a tone plan for an 80 MHz band being defined in an 802.11ax WLAN system, and
    wherein the second tone plan is a tone plan that is configured by repeating 2 times a tone plan for a 40 MHz band being defined in an 802.11ax WLAN system.

7. A receiving station (STA) in a wireless local area network (WLAN) system, the receiving STA comprising:
    a memory;
    a transceiver; and
    a processor being operatively connected to the memory and the transceiver,
    wherein the processor is configured to:
    receive a Null Data Packet Announcement (NDPA) frame from a transmitting STA,
    receive a Null Data Packet (NDP) frame from the transmitting STA, and
    transmit a feedback frame to the transmitting STA based on the NDP frame,
    wherein the feedback frame includes information on a feedback subcarrier for a wideband, wherein, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036], and wherein [A:Ng:B] indicates that indexes of the feedback subcarrier are set from A to B at a spacing of Ng.

8. A method in a wireless local area network (WLAN) system, the method comprising:
transmitting, by a transmitting station (STA), a Null Data Packet Announcement (NDPA) frame to a receiving STA;
transmitting, by the transmitting STA, a Null Data Packet (NDP) frame to the receiving STA; and
receiving, by the transmitting STA, a feedback frame from the receiving STA based on the NDP frame,
wherein the feedback frame includes information on a feedback subcarrier for a wideband,
wherein, when the wideband is a contiguous 320 MHz band and a grouping value is equal to Ng, indexes of the feedback subcarrier are set to [−2036:Ng:−1540], [−1532:Ng:−1036], [−1012:Ng:−516], [−508:Ng:−12], [12:Ng:508], [516:Ng:1012], [1036:Ng:1532], and [1540:Ng:2036], and
wherein [A:Ng:B] indicates that indexes of the feedback subcarrier are set from A to B at a spacing of Ng.

9. The method of claim 8, wherein the grouping value is equal to an index spacing between the feedback subcarriers.

10. The method of claim 8, wherein, when the grouping value is equal to 4, indexes of the feedback subcarrier are set to [−2036:4:−1540], [4532:4:4036], [4012:4:−516], [−508:4:−12], [12:4:508], [516:4:1012], [1036:4:1532], and [1540:4:2036], and wherein, when the grouping value is equal to 16, indexes of the feedback subcarrier are set to [−2036:16:−1540], [4532:16:4036], [−1012:16:−516], [−508:16:−12], [12:16:508], [516:16:1012], [1036:16:1532], and [1540:16:2036].

11. The method of claim 8, wherein, when the wideband is configured of a non-contiguous first 160 MHz band and second 160 MHz band, and when the grouping value is equal to Ng, indexes of a feedback subcarrier for the first 160 MHz band are set to [−1012:Ng:−516], [−508:Ng:−12], [12:Ng:508], and [516:Ng:1012], and indexes of a feedback subcarrier for the second 160 MHz band are set to [−1012:Ng:−516], [−508:Ng:−12], [12:Ng:508], and [516:Ng:1012].

12. The method of claim 11, wherein, when the grouping value is equal to 4, indexes of the feedback subcarrier for the first and second 160 MHz bands are set to [−1012:4:−516], [−508:4:−12], [12:4:508], and [516:4:1012], and wherein, when the grouping value is equal to 16, indexes of the feedback subcarrier for the first and second 160 MHz bands are set to [−1012:16:−516], [−508:16:−12], [12:16:508], and [516:16:1012].

13. The method of claim 8, further comprising:
transmitting, by the transmitting STA, information on a tone plan to the receiving STA,
wherein the information on the tone plan includes allocation information on that a tone plan for the wideband is configured by repeating a tone plan for an 80 MHz band,
wherein the tone plan for the 80 MHz band is set as one of a first tone plan or a second tone plan,
wherein the first tone plan is a tone plan for an 80 MHz band being defined in an 802.11ax WLAN system, and
wherein the second tone plan is a tone plan that is configured by repeating 2 times a tone plan for a 40 MHz band being defined in an 802.11ax WLAN system.

* * * * *